US012232107B2

(12) United States Patent
Gerami et al.

(10) Patent No.: US 12,232,107 B2
(45) Date of Patent: Feb. 18, 2025

(54) NETWORK NODE, WIRELESS DEVICE AND METHODS THEREIN FOR PERFORMING UPLINK TRANSMISSIONS

(71) Applicant: Telefonaktiebolaget LM Ericsson (publ), Stockholm (SE)

(72) Inventors: Majid Gerami, Lund (SE); Bikramjit Singh, Kirkkonummi (FI); Niklas Andgart, Södra Sandby (SE); Yufei Blankenship, Kildeer, IL (US); Jonas Fröberg Olsson, Ljungsbro (SE); Mattias Andersson, Sundbyberg (SE); Jianwei Zhang, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 321 days.

(21) Appl. No.: 17/767,182

(22) PCT Filed: Oct. 7, 2020

(86) PCT No.: PCT/SE2020/050959
§ 371 (c)(1),
(2) Date: Apr. 7, 2022

(87) PCT Pub. No.: WO2021/071414
PCT Pub. Date: Apr. 15, 2021

(65) Prior Publication Data
US 2022/0386336 A1 Dec. 1, 2022

Related U.S. Application Data

(60) Provisional application No. 62/911,575, filed on Oct. 7, 2019.

(51) Int. Cl.
H04W 72/12 (2023.01)
H04L 1/08 (2006.01)
(Continued)

(52) U.S. Cl.
CPC .......... *H04W 72/1268* (2013.01); *H04L 1/08* (2013.01); *H04W 72/23* (2023.01)

(58) Field of Classification Search
CPC ...... H04W 72/1268; H04W 72/23; H04L 1/08
See application file for complete search history.

(56) References Cited

U.S. PATENT DOCUMENTS 11,576,158 B2   2/2023   Liu et al.
2017/0265186 A1  9/2017   Cariou et al.
(Continued)

FOREIGN PATENT DOCUMENTS

CN   104363624 A   2/2015
CN   106027197 A   10/2016
(Continued)

OTHER PUBLICATIONS

International Search Report and Written Opinion dated Dec. 15, 2020 for International Application No. PCT/SE2020/050959 filed Oct. 7, 2020, consisting of 10 pages.
(Continued)

Primary Examiner — Brenda H Pham
(74) Attorney, Agent, or Firm — Weisberg I.P. Law, P.A.

(57) ABSTRACT

A method and network node for configuring a WD, to perform uplink transmissions using an uplink configured grant, UL-CG, or a dynamic grant is provided. The network node signals by radio resource control, RRC, signaling to the WD, a time domain resource assignment, TDRA, table for the uplink transmissions. The network node signals further signals to the WD, an indication of a particular repetition factor to be used by the WD to determine when to perform the uplink transmissions.

26 Claims, 9 Drawing Sheets

(51) Int. Cl.
*H04W 72/1268* (2023.01)
*H04W 72/23* (2023.01)

(56) References Cited

U.S. PATENT DOCUMENTS

| | | | |
|---|---|---|---|
| 2018/0132244 A1 | 5/2018 | Huang et al. | |
| 2018/0234968 A1 | 8/2018 | Sun et al. | |
| 2019/0342921 A1 | 11/2019 | Loehr et al. | |
| 2020/0106566 A1 | 4/2020 | Yeo et al. | |
| 2021/0289540 A1* | 9/2021 | Khoshnevisan | ........ H04L 1/189 |

FOREIGN PATENT DOCUMENTS

| | | | |
|---|---|---|---|
| CN | 108012312 A | 5/2018 | |
| CN | 112075046 A | 12/2020 | |
| EP | 3200542 A1 | 2/2017 | |
| JP | 2016527831 A | 9/2016 | |
| WO | 2018141932 A1 | 8/2018 | |
| WO | 2019211667 A2 | 11/2019 | |
| WO | 2020065617 A1 | 4/2020 | |

OTHER PUBLICATIONS

3GPP TSG RAN WG1 Meeting #98 R1-1908438; Title: On PUSCH enhancements for NR URLLC; Agenda Item: 7.2.6.3; Source: Nokia, Nokia Shanghai Bell; Document for: Discussion and Decision; Date and Location: Aug. 26-30, 2019, Prague, Czech; consisting of 8 pages.
3GPP TSG RAN WG1 #96bis R1-1905432; Title: On PUSCH enhancement for NR URLLC; Source: WILUS Inc.; Agenda Item: 7.2.6.3; Document for: Discussion/Decision; Date and Location: Apr. 8-12, 2019; Xi'an, China; consisting of 6 pages.
3GPP TSG RAN WG1 #98bis R1-1910223; Title: PUSCH enhancements for URLLC; Source: vivo; Agenda Item: 7.2.6.3; Document for: Discussion and Decision; Date and Location: Oct. 14-20, 2019, Chongqing, China; consisting of 12 pages.
3GPP TSG RAN WG1 Meeting #98 R1-1909101; Title: PUSCH enhancements for NR URLLC; Source: Sharp; Agenda Item: 7.2.6.3; Document for: Discussion and Decision; Date and Location: Aug. 26-30, 2019, Prague, CZ; consisting of 9 pages.
3GPP TR 38.824 V16.0.0; 3rd Generation Partnership Project; Technical Specification Group Radio Access Network; Study on physical layer enhancements for NR ultra-reliable and low latency case (URLLC) (Release 16); Mar. 2019; consisting of 78 pages.
3GPP TSG-RAN WG1 Meeting #98 R1-1909639; Title: Summary of Tuesday offline discussion on PUSCH enhancements for NR eURLLC (AI 7.2.6.3); Agenda Item: 7.2.6.3; Source: Nokia, Nokia Shanghai Bell; Document for: Discussion and Decision; Date and Location: Aug. 26-30, 2019, Prague, Czech Republic; consisting of 27 pages.
3GPP TS 38.331 V15.3.0; 3rd Generation Partnership Project; Technical Specification Group Radio Access Network; NR; Radio Resource Control (RRC) protocol specification (Release 15); Sep. 2018; consisting of 445 pages.
3GPP TS 38.214 V15.2.0; 3rd Generation Partnership Project; Technical Specification Group Radio Access Network; NR; Physical layer procedures for data (Release 15); Jun. 2018; consisting of 94 pages.
3GPP TSG RAN WG1 Meeting #96bis Tdoc R1-1904124; Title: PUSCH Enhancements for NR URLLC; Agenda Item: 7.2.6.3; Source: Ericsson; Document for: Discussion, Decision; Location and Date: Xi'an, China, Apr. 8-12, 2019, consisting of 13 pages.
3GPP TSG RAN WG1 Meeting #97 R1-1906093; Title: PUSCH Enhancements for NR URLLC; Agenda Item: 7.2.6.3; Source: Ericsson; Document for: Discussion, Decision; Location and Date: Reno, USA, May 13-17, 2019, consisting of 16 pages.
3GPP TSG RAN WG1 Meeting #98 R1-1908123 (Downloaded as R1-1908122); Title: PUSCH Enhancements for NR URLLC; Agenda Item: 7.2.6.3; Source: Ericsson; Document for: Discussion, Decision; Location and Date: Prague, CZ, Aug. 26-30, 2019, consisting of 16 pages.
3GPP TS 38.213 V15.2.0; 3rd Generation Partnership Project; Technical Specification Group Radio Access Network; NR; Physical layer procedures for control (Release 15); Jun. 2018, consisting of 99 pages.
3GPP TSG RAN WG1 Meeting #92 R1-1802416; Title: Remaining issues of UL transmission procedures; Source: Intel Corporation; Agenda item: 7.1.3.3.4; Document for: Discussion and Decision; Location and Date: Athens, Greece, Feb. 26-Mar. 2, 2018, consisting of 4 pages.
3GPP TSG RAN WG1 Meeting #92 R1-1802215; Title: Remaining issues on UL data transmission procedure; Agenda Item: 7.1.3.3.4; Source: LG Electronics; Document for: Discussion and decision; Location and Date: Athens, Greece, Feb. 26-Mar. 2, 2018, consisting of 13 pages.
Wang et al. "Design and Improvment of RRC Message Transmission Scheme in LTE System" Telecommunication Engineering; vol. 50 No. 9; Sep. 2010, consisting of 5 pages.
U.S. Office Action dated Dec. 28, 2023 for U.S. Appl. No. 17/275,210, consisting of 12 pages.
U.S. Office Action dated May 6, 2024 for U.S. Appl. No. 17/275,210, consisting of 33 pages.
Chinese Office Action and English Summary dated Jul. 19, 2023 for Application No. 201980078659, consisting of 15 pages.
Chinese Office Action and English Summary dated Mar. 22, 2024 for Application No. 201980078659, consisting of 9 pages.
Chinese Office Action and English Summary dated May 25, 2024 for Application No. 201980078659, consisting of 11 pages.
Japanese Office Action and English Summary dated Mar. 10, 2023 for Application No. 2022076719, consisting of 3 pages.

\* cited by examiner

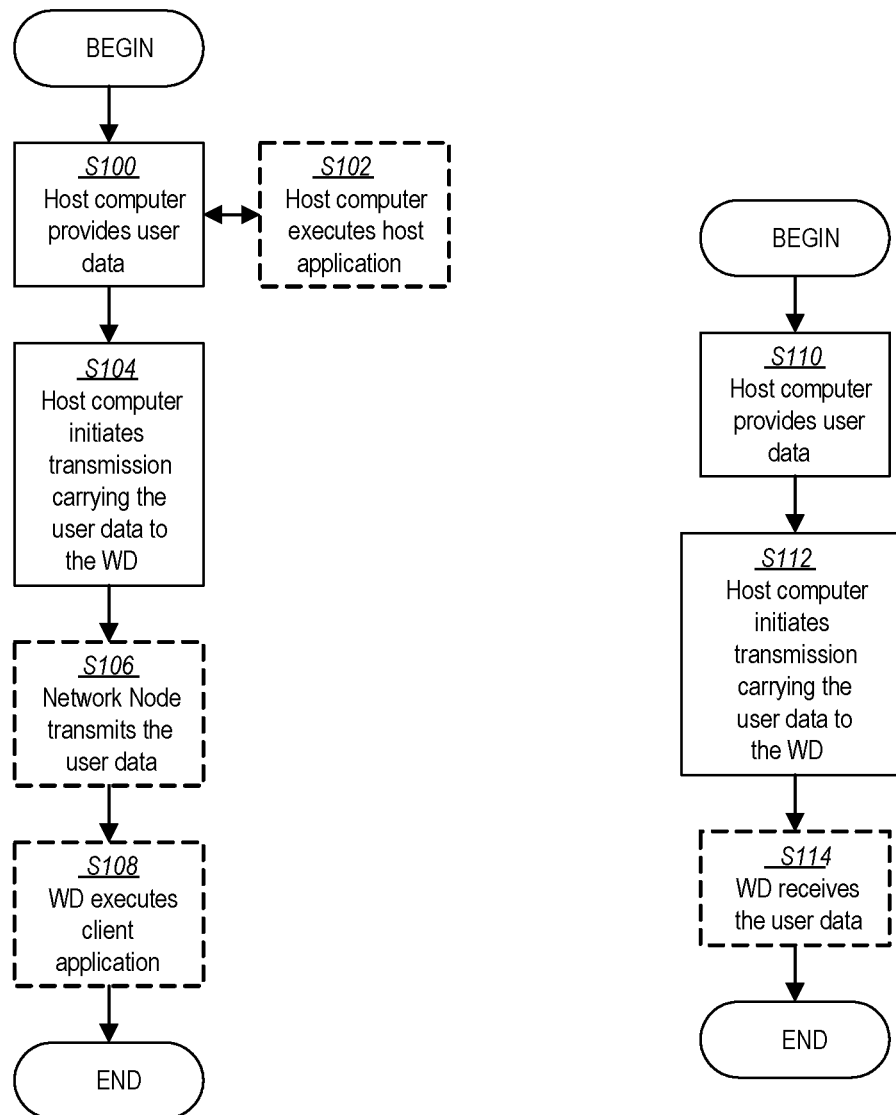

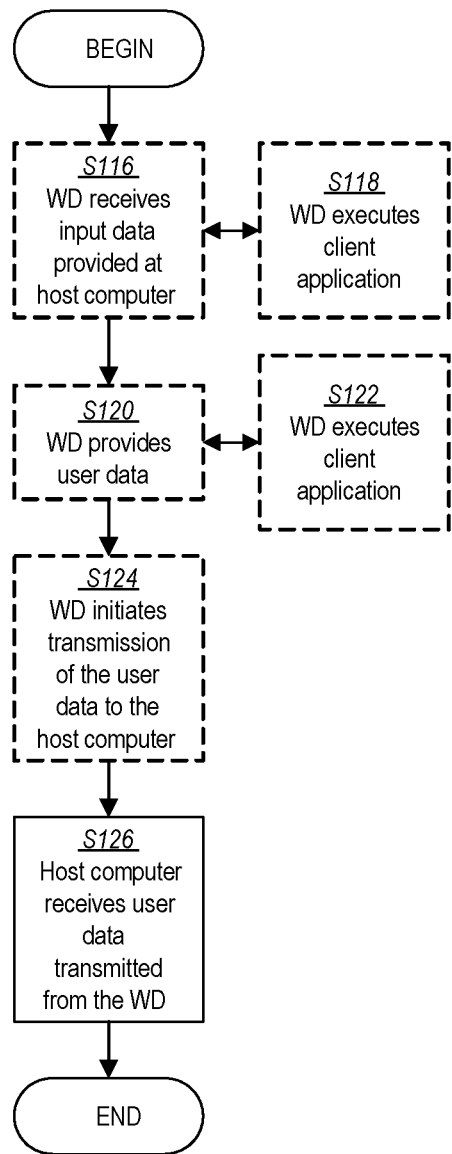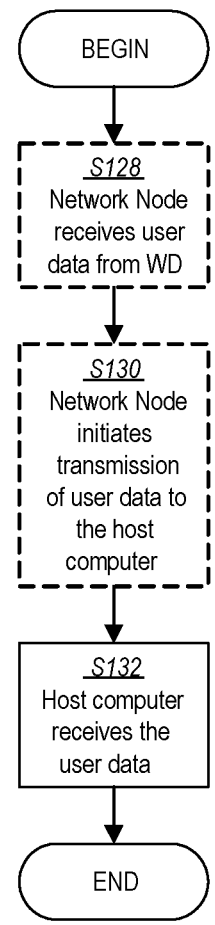
FIG. 6
FIG. 7

NETWORK NODE, WIRELESS DEVICE AND METHODS THEREIN FOR PERFORMING UPLINK TRANSMISSIONS

CROSS-REFERENCE TO RELATED APPLICATIONS

This application is a Submission Under 35 U.S.C. § 371 for U.S. National Stage Patent Application of International Application No.: PCT/SE2020/050959, filed Oct. 7, 2020 entitled "NETWORK NODE, WIRELESS DEVICE AND METHODS THEREIN FOR PERFORMING UPLINK TRANSMISSIONS," which claims priority to U.S. Provisional Application No. 62/911,575, filed Oct. 7, 2019, the entireties of both of which are incorporated herein by reference.

FIELD

The present disclosure relates to wireless communications, and in particular, to a network node and a wireless device and methods therein for performing uplink transmissions using uplink (UL) configured grant (CG)/downlink (DL) semipersistent scheduling (SPS) transmission.

BACKGROUND

The New Radio (NR) standard (also referred to as "5G") developed by the Third Generation Partnership Project (3GPP) supports two types of transmissions, Type A and Type B. Type A transmissions are slot-based, where a slot is defined as 14 orthogonal frequency division multiplexed (OFDM) symbols, while Type B is non-slot-based. Type B transmission enables short transmissions that can start and end more flexibly than Type A. Mini-slot transmissions can be dynamically scheduled and in 3GPP Release 15 of the New Radio standard, mini-slots:

(1) Can be of length 7, 4, or 2 symbols in DL and UL; and
(2) Can start and end within in any symbol within a slot.

Type B transmissions are useful for URLLC (Ultra-Reliable Low-Latency Communication) since Type B transmissions reduce latency. For example, the transmissions can be scheduled and start sooner than for slot-based transmissions where scheduling and transmissions need to wait until the next slot.

NR supports two types of configured grants, Type 1 and Type 2. For Type 1, the WD is radio resource control (RRC) configured with a grant that indicates all needed transmission parameters, while for Type 2 the configured grant is partly RRC configured and partly L1 signaled (downlink control information (DCI) signaling). For the Type 2 configured grant, the resource allocation follows an uplink (UL) grant received on the DCI and the resource then recurs periodically, the periodicity being configured by RRC. The UL grant has the time-domain resource assignment field that provides a row index of a higher layer configured table pusch-symbolAllocation, where the indexed row defines the slot offset K2, the start and length indicator SLIV, and the physical uplink shared channel (PUSCH) mapping type to be applied in the PUSCH transmission. The WD transmits a MAC-CE (Medium Access Control-Control Element) confirmation message when the configured grant is activated or deactivated. The RRC ConfiguredGrantConfig information element (IE) is defined in 3GPP Technical Standard (TS) 38.331, as shown below according to TS 38.331 version V15.3.0.

| ConfiguredGrantConfig information element |
| --- |
| ```
-- ASN1START
-- TAG-CONFIGUREDGRANTCONFIG-START
ConfiguredGrantConfig ::=               SEQUENCE {
    frequencyHopping                        ENUMERATED {intraSlot, interSlot}
OPTIONAL, -- Need S,
    cg-DMRS-Configuration                   DMRS-UplinkConfig,
    mcs-Table                               ENUMERATED {qam256, qam64LowSE}
OPTIONAL, -- Need S
    mcs-TableTransformPrecoder              ENUMERATED {qam256, qam64LowSE}
OPTIONAL, -- Need S
    uci-OnPUSCH                             SetupRelease { CG-UCI-OnPUSCH }
OPTIONAL, -- Need M
    resourceAllocation                      ENUMERATED { resourceAllocationType0,
resourceAllocationType1, dynamicSwitch },
    rbg-Size                                ENUMERATED {config2}
OPTIONAL, -- Need S
    powerControlLoopToUse                   ENUMERATED {n0, n1},
    p0-PUSCH-Alpha                          P0-PUSCH-AlphaSetId,
    transformPrecoder                       ENUMERATED {enabled, disabled}
OPTIONAL, -- Need S
    nrofHARQ-Processes                      INTEGER(1..16),
    repK                                    ENUMERATED {n1, n2, n4, n8},
    repK-RV                                 ENUMERATED {s1-0231, s2-0303, s3-0000}
OPTIONAL, -- Need R
    periodicity                             ENUMERATED {
                        sym2, sym7, sym1x14, sym2x14, sym4x14, sym5x14,
sym8x14, sym10x14, sym16x14, sym20x14,
                        sym32x14, sym40x14, sym64x14, sym80x14,
sym128x14, sym160x14, sym256x14, sym320x14, sym512x14,
                        sym640x14, sym1024x14, sym1280x14, sym2560x14,
sym5120x14,
                        sym6, sym1x12, sym2x12, sym4x12, sym5x12,
sym8x12, sym10x12, sym16x12, sym20x12, sym32x12,
                        sym40x12, sym64x12, sym80x12, sym128x12,
sym160x12, sym256x12, sym320x12, sym512x12, sym640x12,
                        sym1280x12, sym2560x12
    },
``` |

-continued

| ConfiguredGrantConfig information element | |
|---|---|
| configuredGrantTimer | INTEGER (1..64) |
| OPTIONAL, -- Need R | |
| rrc-ConfiguredUplinkGrant | SEQUENCE { |
| timeDomainOffset | INTEGER (0..5119), |
| timeDomainAllocation | INTEGER (0..15), |
| frequencyDomainAllocation | BIT STRING (SIZE(18)), |
| antennaPort | INTEGER (0..31), |
| dmrs-SeqInitialization | INTEGER (0..1) |
| OPTIONAL, -- Need R | |
| precodingAndNumberOfLayers | INTEGER (0..63), |
| srs-ResourceIndicator | INTEGER (0..15) |
| OPTIONAL, -- Need R | |
| mcsAndTBS | INTEGER (0..31), |
| frequencyHoppingOffset | INTEGER (1.. |
| maxNrofPhysicalResourceBlocks-1) | OPTIONAL, -- Need R |
| pathlossReferenceIndex | INTEGER (0..maxNrofPUSCH- |
| PathlossReferenceRSs-1), | |
| ... | |
| } | OPTIONAL, -- |
| Need R | |
| ... | |
| } | |
| CG-UCI-OnPUSCH ::= CHOICE { | |
| dynamic | SEQUENCE (SIZE (1..4)) OF BetaOffsets, |
| semiStatic | BetaOffsets |
| } | |

3GPP TS 38.214 version V. 15.2.0, Section 6.12.3.1, states that:

"For both Type 1 and Type 2 PUSCH transmissions with a configured grant, when the WD is configured with repK>1, the WD shall repeat the TB across the repK consecutive slots applying the same symbol allocation in each slot. If the WD procedure for determining slot configuration, as defined in subclause 11.1 of [6, TS 38.213], determines symbols of a slot allocated for PUSCH as downlink symbols, the transmission on that slot is omitted for multi-slot PUSCH transmission."

RV-Sequence in Repetitions Based on 3GPP Rel-15:

3GPP 38.214 V. 15.2.0 Section 6.12.3.1, states that:

"The higher layer configured parameters repK and repK-RV define the K repetitions to be applied to the transmitted transport block, and the redundancy version pattern to be applied to the repetitions. For the nth transmission occasion among K repetitions, n=1, 2, . . . , K, it is associated with (mod(n−1,4)+1)th value in the configured RV sequence. The initial transmission of a transport block may start at the first transmission occasion of the K repetitions if the configured RV sequence is {0, 2, 3, 1}, any of the transmission occasions of the K repetitions that are associated with RV=0 if the configured RV sequence is {0, 3, 0, 3}, any of the transmission occasions of the K repetitions if the configured RV sequence is {0, 0, 0, 0}, except the last transmission occasion when K=8.

For any RV sequence, the repetitions shall be terminated after transmitting K repetitions, or at the last transmission occasion among the K repetitions within the period P, or when a UL grant for scheduling the same TB is received within the period P, whichever is reached first. The WD is not expected to be configured with the time duration for the transmission of K repetitions larger than the time duration derived by the periodicity P."

where RV is a random variable.

Multi-Segment Transmission:

It was considered by a 3GPP group that one physical uplink shared channel (PUSCH) transmission instance not be allowed to cross the slot boundary at least for grant-based PUSCH. Since similar issues apply for PUSCH based on dynamic grant and configured grant. It seems reasonable to also consider that the condition of not crossing a slot boundary also applies for PUSCH transmissions based on configured grant.

Assuming this, the only way to transmit a longer PUSCH close to the slot boundary is to use repetitions, with some repetitions in the current slot and some in the next.

An example setup could target a total transmission length of 8 os, and starting transmission opportunities every 2 os, with a periodicity of 8 os. The frequent transmission opportunities could be either through multiple configurations, or by allowing the transmission to cross the periodicity boundary.

There are two different cases as illustrated in FIG. 1. In the first case, with transmission starting in symbol 0, the transmission does not cross the slot boundary. In this case there is only one repetition with length 8. In the second case, with transmission starting in symbol 8, there are two repetitions, one of length 6 in the current slot, and one of length 2 in the next slot.

Option 4 Transmission

It has been considered to support a way of transmitting the PUSCH that allows both multi-segment transmission and back-to-back repetition. The way to support this is referred to as option 4. The following description is from a discussion of the 3GPP:

The following have been considered:
Adopt Option 4 with the following update:
a) The time domain resource assignment (TDRA) field in the DCI or the TDRA parameter in the type 1 configured grant indicates the resource for the first "nominal" repetition;
i) FFS the detailed interaction with the procedure of UL/DL direction determination.

The description of Option 4 from 3GPP TR 38.824:

"One or more actual PUSCH repetitions in one slot, or two or more actual PUSCH repetitions across slot boundary in consecutive available slots, is supported using one UL grant for dynamic PUSCH, and one configured grant configuration for configured grant PUSCH. It further consists of:
 The number of the repetitions signaled by gNB represents the "nominal" number of repetitions. The actual number of repetitions can be larger than the nominal number;
  a) FFS dynamically or semi-statically signalled for dynamic PUSCH and type 2 configured grant PUSCH;
 The time domain resource assignment (TDRA) field in the DCI or the TDRA parameter in the type 1 configured grant indicates the resource for the first "nominal" repetition;
 The time domain resources for the remaining repetitions are derived based at least on the resources for the first repetition and the UL/DL direction of the symbols;
  a) FFS the detailed interaction with the procedure of UL/DL direction determination;
 If a "nominal" repetition goes across the slot boundary or DL/UL switching point, this "nominal" repetition is split into multiple PUSCH repetitions, with one PUSCH repetition in each UL period in a slot;
  a) Handling of the repetitions under some conditions, e.g., when the duration is too small due to splitting, is to be further investigated in the WI phase;
 No DMRS sharing across multiple PUSCH repetitions;
 The maximum TBS size is not increased compared to Rel-15;
 FFS: L>14;
 S+L can be larger than 14;
 FFS: The bit width for TDRA is up to 4 bits;
 Note: different repetitions may have the same or different RV."

In addition, the following has been considered regarding option 4:
 For option 4, dynamic indication of the nominal number of repetitions in the DCI scheduling dynamic PUSCH is supported for PUSCH enhancements. The dynamic indication can be enabled or disabled by the gNB;
 b) FFS the exact signaling method;
 c) FFS the exact DCI format(s);
 d) FFS the exact mechanism to enable or disable;
 e) FFS the DCI activating type 2 configured grant PUSCH;
 For both options 4 and 6, frequency hopping is supported;
 f) FFS details.

Time Domain Resource Allocation in 3GPP Release 15 (Rel-15)

Table 4 below defines the subcarrier spacing specific values j. j is used in determination of $K\_2^\wedge$ in conjunction with Table 2, for normal cyclic prefix (CP) or with Table 3 for extended CP, where $\mu\_PUSCH$ is the subcarrier spacing configurations for PUSCH.

Table 5 defines the additional subcarrier spacing specific slot delay value for the first transmission of PUSCH scheduled by the random access response (RAR). When the WD transmits a PUSCH scheduled by RAR, the $\Delta$ value specific to the PUSCH subcarrier spacing $\mu PUSCH$ is applied in addition to the K2 value.

TABLE 1

| RNTI | PDCCH search space | pusch-ConfigCommon includes pusch-TimeDomainAllocationList | pusch-Config includes pusch-TimeDomainAllocationList | PUSCH time domain resource allocation to apply |
|---|---|---|---|---|
| PUSCH scheduled by MAC RAR as described in subclause 8.2 of [6, TS 38.213] | | No Yes | — | Default A pusch-TimeDomainAllocationList provided in pusch-ConfigCommon |
| C-RNTI, MCS-C-RNTI, TC-RNTI, CS-RNTI | Any common search space associated with CORESET 0 | No Yes | — | Default A pusch-AlloTimeDomaincationList provided in pusch-ConfigCommon |
| C-RNTI, MCS-C-RNTI, TC-RNTI, CS-RNTI, SP-CSI-RNTI | Any common search space not associated with CORESET 0, UE specific search space | No Yes No/Yes | No No Yes | Default A pusch-TimeDomainAllocationList provided in pusch-ConfigCommon pusch-TimeDomainAllocationList provided in pusch-Config |

TABLE 2

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |

TABLE 2-continued

| Row index | PUSCH mapping type | $K_2$ | S | L |
|---|---|---|---|---|
| 15 | Type A | j + 3 | 0 | 14 |
| 16 | Type A | j + 3 | 0 | 10 |

TABLE 3

| Row index | PUSCH mapping type | $K_2$ | S | L |
|---|---|---|---|---|
| 1 | Type A | j | 0 | 8 |
| 2 | Type A | j | 0 | 12 |
| 3 | Type A | j | 0 | 10 |
| 4 | Type B | j | 2 | 10 |
| 5 | Type B | j | 4 | 4 |
| 6 | Type B | j | 4 | 8 |
| 7 | Type B | j | 4 | 6 |
| 8 | Type A | j + 1 | 0 | 8 |
| 9 | Type A | j + 1 | 0 | 12 |
| 10 | Type A | j + 1 | 0 | 10 |
| 11 | Type A | j + 2 | 0 | 6 |
| 12 | Type A | j + 2 | 0 | 12 |
| 13 | Type A | j + 2 | 0 | 10 |
| 14 | Type B | j | 8 | 4 |
| 15 | Type A | j + 3 | 0 | 8 |
| 16 | Type A | j + 3 | 0 | 10 |

TABLE 4

| $\mu_{PUSCH}$ | j |
|---|---|
| 0 | 1 |
| 1 | 1 |
| 2 | 2 |
| 3 | 3 |

TABLE 5

| $\mu_{PUSCH}$ | Δ |
|---|---|
| 0 | 2 |
| 1 | 3 |
| 2 | 4 |
| 3 | 6 |

Dynamic Repetition for PUSCH

In Long Term Evolution (LTE), the WD can be configured with different repetition factor or slot aggregation. However, with a field in the downlink control information (DCI), the WD is dynamically indicated with the repetition factor or slot aggregation factor. This number of slots can be configured from the set {2, 4, 8}.

In LTE 3GPP Rel-14 the feature of PUSCH enhancement was introduced where the use of repetitions for PUSCH is dynamically configured (via DCI), and the number of repetitions that can be used is extended from 4 to a set {1, 2, 4, 8, 16, 32}.

In the current state, the repetition factor (repK) is determined semi-statistically, i.e., by RRC configuration. In an environment where channel state and interference are changing fast or overlapping traffic may happen suddenly, it will be beneficial to change the number of repetitions dynamically, i.e., by DCI. In addition, the channel condition might be better than what was expected initially; then a smaller number of repetitions might be enough to achieve the required reliability. Thus, by semi-statistically determining repK, the radio resources may be inefficiently used.

SUMMARY

Some embodiments advantageously provide methods and network nodes for repetition in uplink (UL) configured grant (CG)/downlink (DL) semipersistent scheduling (SPS) transmission.

RRC determines a set of possible repetition factors for UL-CG/DL-SPS. Then, the actual repetition factor is signaled to the WD by DCI for Type 2 UL-CG/DL-SPS.

By dynamic change of the number of repetitions, the reliability of transmission improves. Also, radio resources can be used more efficiently.

Dynamic repetition has been proposed recently for NR PUSCH. This disclosure extends the idea of dynamic repetition for UL-CG/DL-SPS. Compared to LTE, in NR there are two types of repetition, i.e., back-to-back repletion or slot-based repetition. Then, there may be changes in an RRC table and DCI signaling. A time domain resource allocation (TDRA) table may be used to combine back-to-back repetition and slot-based repetition and then efficiently signal the number of repetitions, which saves the number of required bits for repetition indication.

According to one aspect, a network node configured to configure a wireless device, WD, to perform uplink transmissions. The network node includes processing circuitry configured to determine a set of repetition factors for an uplink configured grant, UL-CG, or for a dynamic grant, each repetition factor indicating a number of repetitions of performing uplink transmissions. The processing circuitry is further configured to signal by radio resource control, RRC, signaling, an indication of the determined set of repetition factors to the WD. The processing circuitry is further configured to determine a particular one of the repetition factors in the determined set of repetition factors to be used by the WD to determine when to perform the uplink transmissions. The processing circuitry is also configured to signal in downlink control information, DCI, an indication of the particular one of the repetition factors to be used by the WD to determine when to perform the uplink transmissions.

According to this aspect, in some embodiments, determining the set of repetition factors includes forming a union of two subsets of repetition factors, one of the two subsets being fixed and the other of the two subsets being configurable. In some embodiments, the determined set of repetition factors includes at least one integer that is other than a power of two. In some embodiments, the particular one of the repetition factors to be used by the WD is indicated by a single offset to be added to or subtracted from a preconfigured repetition factor. In some embodiments, a time domain resource assignment, TDRA, table is configured to indicate whether the particular one of the repetition factors to be used by the WD is for slot based repetition or back to back repetition. In some embodiments, RRC signaling is used to transmit the TDRA table to the WD and wherein DCI indicates an entry in the table indicating a nominal number of repetitions to be used by the WD to determine when to perform the uplink transmissions. In some embodiments, a number of repetitions indicated by the particular one of the repetition factors to be used by the WD overrides a repetition factor indicated by RRC signaling. In some embodiments, RRC signaling is used to indicate whether the uplink transmissions are to use slot based repetition or back to back repetition. In some embodiments, each repetition factor in the determined set of repetition factors is associated with a different modulation and coding scheme. In some embodiments, DCI signaling is used to indicate a time between repetitions of uplink transmissions. In some embodiments, the particular one of the repetition factors to be used by the WD to determine when to perform the uplink transmissions is indicated in a modulation and coding scheme, MCS, field of the DCI. In some embodiments, a repetition factor is one of a number of repetitions corresponding to a single grant.

According to another aspect, a method in a network node to configure a wireless device, WD, to perform uplink transmissions is provided. The method includes determining a set of repetition factors for an uplink configured grant, UL-CG, or for a dynamic grant, each repetition factor indicating a number of repetitions of performing uplink transmissions. The method also includes signaling by radio resource control, RRC, signaling, an indication of the determined set of repetition factors to the WD. The method also includes determining a particular one of the repetition factors in the determined set of repetition factors to be used by the WD to determine when to perform the uplink transmissions. The method further includes signaling in downlink control information, DCI, an indication of the particular one of the repetition factors to be used by the WD to determine when to perform the uplink transmissions.

According to this aspect, in some embodiments, determining the set of repetition factors includes forming a union of two subsets of repetition factors, one of the two subsets being fixed and the other of the two subsets being configurable. In some embodiments, the determined set of repetition factors includes at least one integer that is other than a power of two. In some embodiments, the particular one of the repetition factors to be used by the WD is indicated by a single offset to be added to or subtracted from a preconfigured repetition factor. In some embodiments, a time domain resource assignment, TDRA, table is configured to indicate whether the particular one of the repetition factors to be used by the WD is for slot based repetition or back to back repetition. In some embodiments, RRC signaling is used to transmit the TDRA table to the WD and wherein DCI indicates an entry in the table indicating a nominal number of repetitions to be used by the WD to determine when to perform the uplink transmissions. In some embodiments, a number of repetitions indicated by the particular one of the repetition factors to be used by the WD overrides a repetition factor indicated by RRC signaling. In some embodiments, RRC signaling is used to indicate whether the uplink transmissions are to use slot based repetition or back to back repetition. In some embodiments, each repetition factor in the determined set of repetition factors is associated with a different modulation and coding scheme. In some embodiments, DCI signaling is used to indicate a time between repetitions of uplink transmissions. In some embodiments, the particular one of the repetition factors to be used by the WD to determine when to perform the uplink transmissions is indicated in a modulation and coding scheme, MCS, field of the DCI. In some embodiments, a repetition factor is one of a number of repetitions corresponding to a single grant.

According to yet another aspect, a WD is configured to perform uplink transmissions to a network node. The WD includes processing circuitry configured to receive, via radio resource control, RRC, signaling, a time domain resource assignment, TDRA, table configured to indicate a set of repetition factors from which a repetition factor is to be used by the WD for slot based repetition or back to back repetition of uplink transmission. The processing circuitry is further configured to one of: receive, via downlink control information, DCI, signaling, an indication of a particular repetition factor of the set of repetition factors, the indicated particular repetition factor for use by the WD for uplink transmissions; and select a default repetition factor, the default repetition factor for use by the WD for uplink transmissions.

According to this aspect, in some embodiments, the default repetition factor is a minimum repetition factor in a set of repetition factors signaled via RRC signaling. In some embodiments, the default repetition factor is selected when the WD is not designed to extract an indication of a repetition factor in the DCI.

According to another aspect, a method in a wireless device, WD, configured to perform uplink transmissions to a network node is provided. The method includes receiving, via radio resource control, RRC, signaling, a time domain resource assignment, TDRA, table configured to indicate a set of repetition factors from which a repetition factor is for use by the WD for slot based repetition or back to back repetition of uplink transmission. The method also includes one of: receiving, via downlink control information, DCI, signaling, an indication of a particular repetition factor of the set of repetition factors, the indicated particular repetition factor for use by the WD for uplink transmissions; and selecting a default repetition factor, the default repetition factor for use by the WD for uplink transmissions.

According to this aspect, in some embodiments, the default repetition factor is a minimum repetition factor in a set of repetition factors signaled via RRC signaling. In some embodiments, the default repetition factor is selected when the WD is not designed to extract an indication of a repetition factor in the DCI.

According to yet another aspect, a network node is configured to configure a wireless device, WD, to perform uplink transmissions. The network node is configured to signal by radio resource control, RRC, signaling to the WD, a time domain resource assignment, TDRA, table for the uplink transmissions and signal to the WD, an indication of a particular repetition factor to be used by the WD to determine when to perform the uplink transmissions.

According to this aspect, in some embodiments, the TDRA table comprises a set of repetition factors for an uplink configured grant, UL-CG, or for a dynamic grant and wherein each repetition factor in the set of repetition factors indicates a number of repetitions of performing uplink transmissions. In some embodiments, the particular repetition factor is comprised in the set of repetition factors and wherein the indication of the particular repetition factor comprises an entry in the TDRA table indicating a number of repetitions to be used by the WD to determine when to perform the uplink transmissions. In some embodiments, the number of repetitions indicated by the entry in the TDRA table overrides a repetition factor indicated by RRC signaling. In some embodiments, the indication of the particular repetition factor to be used by the WD is signaled by the network node using RRC signaling. In some embodiments, the indication of the particular repetition factor to be used by the WD is signaled by the network node using downlink control information, DCI, signaling. In some embodiments, the TDRA table is configured to indicate whether the particular repetition factor to be used by the WD is for slot-based repetition or back-to-back repetition. In some embodiments, the network node is further configured to use RRC signaling to indicate to the WD whether the uplink transmissions are to use slot-based repetition or back-to-back repetition. In some embodiments, the indication of the particular repetition factor to be used by the WD is signaled by the network node using RRC signaling and wherein a number of repetitions for an uplink configured grant, UL-CG, or a dynamic grant, to be used by the WD to determine when to perform the uplink transmissions is determined by the WD based on the particular repetition factor when the TDRA table does not indicate a nominal number of repetitions and the UL-CG, or the dynamic grant, is activated by a physical downlink control channel, PDCCH, in a downlink control information, DCI, format associated with that TDRA table. In some embodiments, the indication of the particular repetition factor to be used by the WD is signaled by the network node using RRC signaling and wherein the particular repetition factor is ignored by the WD when the TDRA table indicates a nominal number of repetitions and the UL-CG, or the dynamic grant, is activated by a physical downlink control channel, PDCCH, in a downlink control information, DCI, format associated with that TDRA table. In some embodiments, a number of repetitions for the uplink configured grant, UL-CG, or the dynamic grant, to be used by the WD to determine when to perform the uplink transmissions is determined by the WD based on the nominal number of repetitions indicated in the TDRA table. In some embodiments, the uplink configured grant, UL-CG, is a UL-CG type 2.

According to another aspect, a method in a network node configured to configure a wireless device, WD, to perform uplink transmissions is provided. The method includes signaling by radio resource control, RRC, signaling to the WD, a time domain resource assignment, TDRA, table for the uplink transmissions, and signaling to the WD, an indication of a particular repetition factor to be used by the WD to determine when to perform the uplink transmissions.

According to this aspect, in some embodiments, the TDRA table comprises a set of repetition factors for an uplink configured grant, UL-CG, or for a dynamic grant and wherein each repetition factor in the set of repetition factors indicates a number of repetitions of performing uplink transmissions. In some embodiments, the particular repetition factor is comprised in the set of repetition factors and wherein the indication of the particular repetition factor comprises an entry in the TDRA table indicating a number of repetitions to be used by the WD to determine when to perform the uplink transmissions. In some embodiments, the number of repetitions indicated by the entry in the TDRA table overrides a repetition factor indicated by RRC signaling. In some embodiments, the indication of the particular repetition factor to be used by the WD is signaled by the network node using RRC signaling. In some embodiments, the indication of the particular repetition factor to be used by the WD is signaled by the network node using downlink control information, DCI, signaling. In some embodiments, the indication of the particular repetition factor to be used by the WD is signaled by the network node using RRC signaling and wherein a number of repetitions for an uplink configured grant, UL-CG, or a dynamic grant, to be used by the WD to determine when to perform the uplink transmissions is determined by the WD based on the particular repetition factor when the TDRA table does not indicate a nominal number of repetitions and the UL-CG is activated by a physical downlink control channel, PDCCH, with a downlink control information, DCI, format associated with that TDRA table. In some embodiments, the indication of the particular repetition factor to be used by the WD is signaled by the network node using RRC signaling and wherein the particular repetition factor is ignored by the WD when the TDRA table indicates a nominal number of repetitions and the UL-CG is activated by a physical downlink control channel, PDCCH, with a downlink control information, DCI, format associated with that TDRA table. In some embodiments, a number of repetitions for the uplink configured grant, UL-CG to be used by the WD to determine when to perform the uplink transmissions is determined by the WD based on the nominal number of repetitions indicated in the TDRA table. In some embodiments, the TDRA table is configured to indicate whether the particular repetition factor to be used by the WD is for slot-based repetition or back-to-back repetition. In some embodiments, the method further includes using RRC signaling to indicate to the WD whether the uplink transmissions are to use slot-based repetition or back-to-back repetition. In some embodiments, the uplink configured grant, UL-CG, is a UL-CG type 2.

According to another aspect, a WD is configured to perform uplink transmissions to a network node. The wireless device 22 is configured to receive, via radio resource control, RRC, signaling from the network node, a time domain resource assignment, TDRA, table for the uplink transmissions; and receive, from the network node, an indication of a particular repetition factor for use by the WD to determine when to perform the uplink transmissions.

According to this aspect, in some embodiments, the TDRA table comprises a set of repetition factors for an uplink configured grant, UL-CG, or for a dynamic grant and wherein each repetition factor in the set of repetition factors indicates a number of repetitions of performing uplink transmissions. In some embodiments, the particular repetition factor is comprised in the set of repetition factors and wherein the indication of the particular repetition factor comprises an entry in the TDRA table indicating a number of repetitions to be used by the WD to determine when to perform the uplink transmissions. In some embodiments, the number of repetitions indicated by the entry in the TDRA table overrides a repetition factor indicated by RRC signaling. In some embodiments, the indication of the particular repetition factor to be used by the WD is received by the WD in RRC signaling from the network node. In some embodiments, the indication of the particular repetition factor to be used by the WD is received by the WD in downlink control information, DCI, signaling from the network node. In some embodiments, the indication of the particular repetition factor to be used by the WD is received by the WD in RRC signaling from the network node and wherein a number of repetitions for an uplink configured grant, UL-CG, to be used by the WD to determine when to perform the uplink transmissions, is determined by the WD based on the particular repetition factor when the TDRA table does not indicate a nominal number of repetitions and the UL-CG is activated by a physical downlink control channel, PDCCH, with a downlink control information, DCI, format associated with that TDRA table. In some embodiments, the indication of the particular repetition factor to be used by the WD is received by the WD in RRC signaling from the network node and wherein the particular repetition factor is ignored by the WD when the TDRA table indicates a nominal number of repetitions and the UL-CG is activated by a physical downlink control channel, PDCCH, with a downlink control information, DCI, format associated with that TDRA table. In some embodiments, a number of repetitions for the uplink configured grant, UL-CG, to be used by the WD to determine when to perform the uplink transmissions is determined by the WD based on the nominal number of repetitions indicated in the TDRA table. In some embodiments, the TDRA table is configured to indicate whether the particular repetition factor to be used by the WD is for slot-based repetition or back-to-back repetition. In some embodiments, the network node is further configured to use RRC signaling to indicate to the WD whether the uplink transmissions are to use slot-based repetition or back-to-back repetition. In some embodiments, the uplink configured grant, UL-CG, is a UL-CG type 2.

According to yet another aspect, a method in a wireless device, WD, configured to perform uplink transmissions to a network node is provided. The wireless device 22 is configured to receive, via radio resource control, RRC, signaling from the network node, a time domain resource assignment, TDRA, table for the uplink transmissions; and receive, from the network node, an indication of a particular repetition factor for use by the WD to determine when to perform the uplink transmissions.

According to this aspect, in some embodiments, the TDRA table comprises a set of repetition factors for an uplink configured grant, UL-CG, or for a dynamic grant and wherein each repetition factor in the set of repetition factors indicates a number of repetitions of performing uplink transmissions. In some embodiments, the particular repetition factor is comprised in the set of repetition factors and wherein the indication of the particular repetition factor comprises an entry in the TDRA table indicating a number of repetitions to be used by the WD to determine when to perform the uplink transmissions. In some embodiments, the number of repetitions indicated by the entry in the TDRA table overrides a repetition factor indicated by RRC signaling. In some embodiments, the indication of the particular repetition factor to be used by the WD is received by the WD in RRC signaling from the network node. In some embodiments, the indication of the particular repetition factor to be used by the WD is received by the WD in downlink control information, DCI, signaling from the network node. In some embodiments, the indication of the particular repetition factor to be used by the WD is received by the WD in RRC signaling from the network node and wherein a number of repetitions for an uplink configured grant, UL-CG, to be used by the WD to determine when to perform the uplink transmissions, is determined by the WD based on the particular repetition factor when the TDRA table does not indicate a nominal number of repetitions and the UL-CG is activated by a physical downlink control channel, PDCCH, with a downlink control information, DCI, format associated with that TDRA table. In some embodiments, the indication of the particular repetition factor to be used by the WD is received by the WD in RRC signaling from the network node and wherein the particular repetition factor is ignored by the WD when the TDRA table indicates a nominal number of repetitions and the UL-CG is activated by a physical downlink control channel, PDCCH, with a downlink control information, DCI, format associated with that TDRA table. In some embodiments, a number of repetitions for the uplink configured grant, UL-CG, to be used by the WD to determine when to perform the uplink transmissions is determined by the WD based on the nominal number of repetitions indicated in the TDRA table. In some embodiments, the TDRA table is configured to indicate whether the particular repetition factor to be used by the WD is for slot-based repetition or back-to-back repetition. In some embodiments, the network node is further configured to use RRC signaling to indicate to the WD whether the uplink transmissions are to use slot-based repetition or back-to-back repetition. In some embodiments, the uplink configured grant, UL-CG, is a UL-CG type 2.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 is a flowchart illustrating exemplary methods implemented in a communication system including a host computer, a network node and a wireless device for executing a client application at a wireless device according to some embodiments of the present disclosure;

FIG. 5 is a flowchart illustrating exemplary methods implemented in a communication system including a host computer, a network node and a wireless device for receiving user data at a wireless device according to some embodiments of the present disclosure;

FIG. 6 is a flowchart illustrating exemplary methods implemented in a communication system including a host computer, a network node and a wireless device for receiving user data from the wireless device at a host computer according to some embodiments of the present disclosure;

FIG. 7 is a flowchart illustrating exemplary methods implemented in a communication system including a host computer, a network node and a wireless device for receiving user data at a host computer according to some embodiments of the present disclosure;

DETAILED DESCRIPTION

Figure 1:
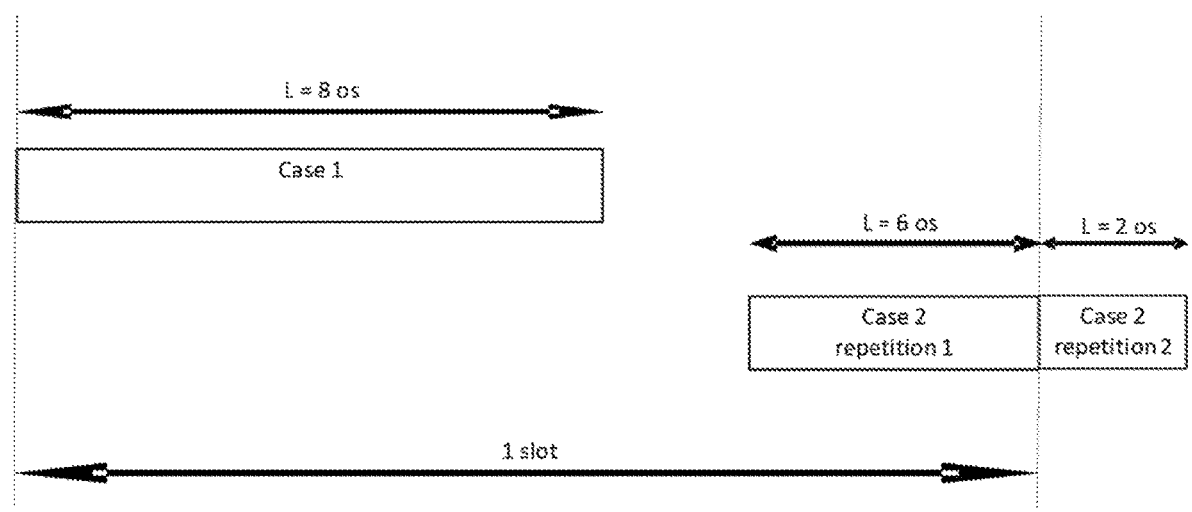
FIG. 1 illustrates repetition timing.

Before describing in detail exemplary embodiments, it is noted that the embodiments reside primarily in combinations of apparatus components and processing steps related to repetition in uplink (UL) configured grant (CG)/downlink (DL) semipersistent scheduling (SPS) transmission. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for repetition in uplink (UL) configured grant (CG)/downlink (DL) semipersistent scheduling (SPS) transmission. According to one aspect, a method includes determining, via radio resource control (RRC), a set of repetition factors for uplink configured grant/downlink semipersistent scheduling (UL-CG/DL-SPS), selecting a repetition factor of the set of repetition factors, and transmitting to a wireless device (WD) in a downlink control information (DCI) message the selected repetition factor.

Figure 2:
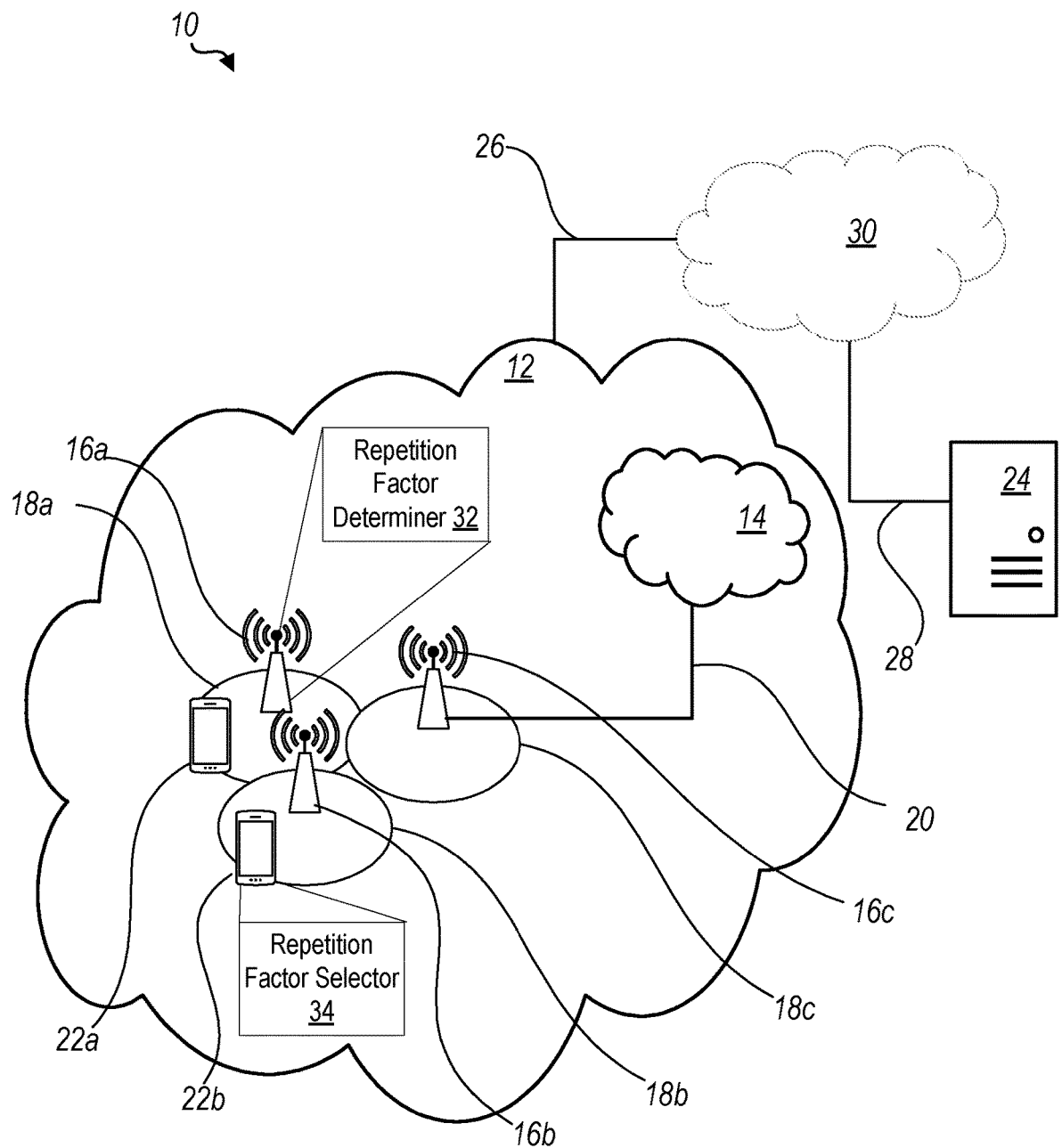
FIG. 2 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a repetition factor determiner 32 which is configured to determine via RRC a set of repetition factors for UL-CG/DL-SPS. A WD 22 is configured to include a repetition factor selector 34 configured to select a number of repetitions from a set of a number of repetitions received from the network node 16.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include repetition factor determiner 32 which is configured to determine via RRC a set of repetition factors for UL-CG/DL-SPS.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. The WD 22 is also configured to include a repetition factor selector 34 configured to select a number of repetitions from a set of a number of repetitions received from the network node 16.

Figure 3:
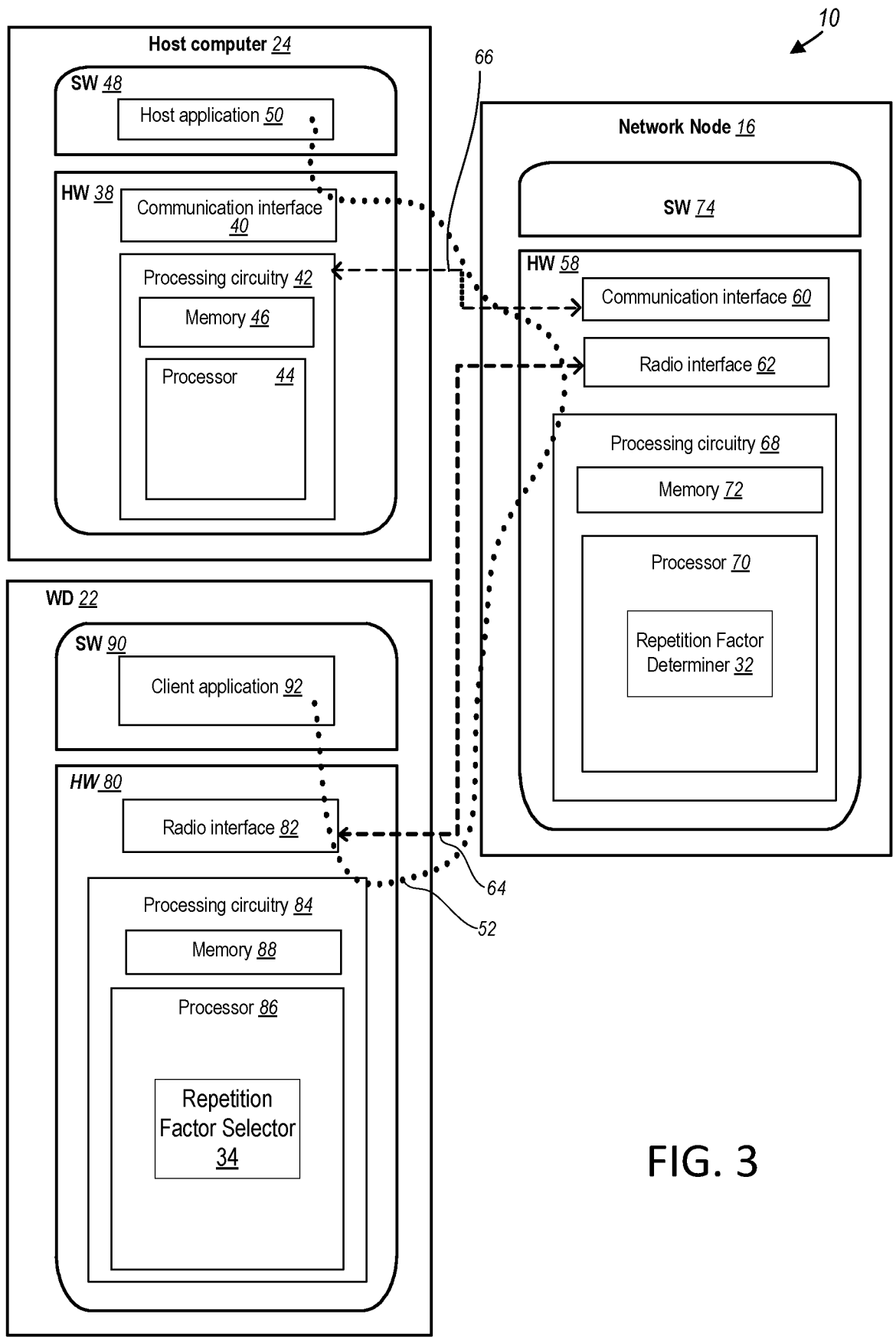
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as repetition factor determiner 32 and repetition factor selector 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 4 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 6 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally, or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 7 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
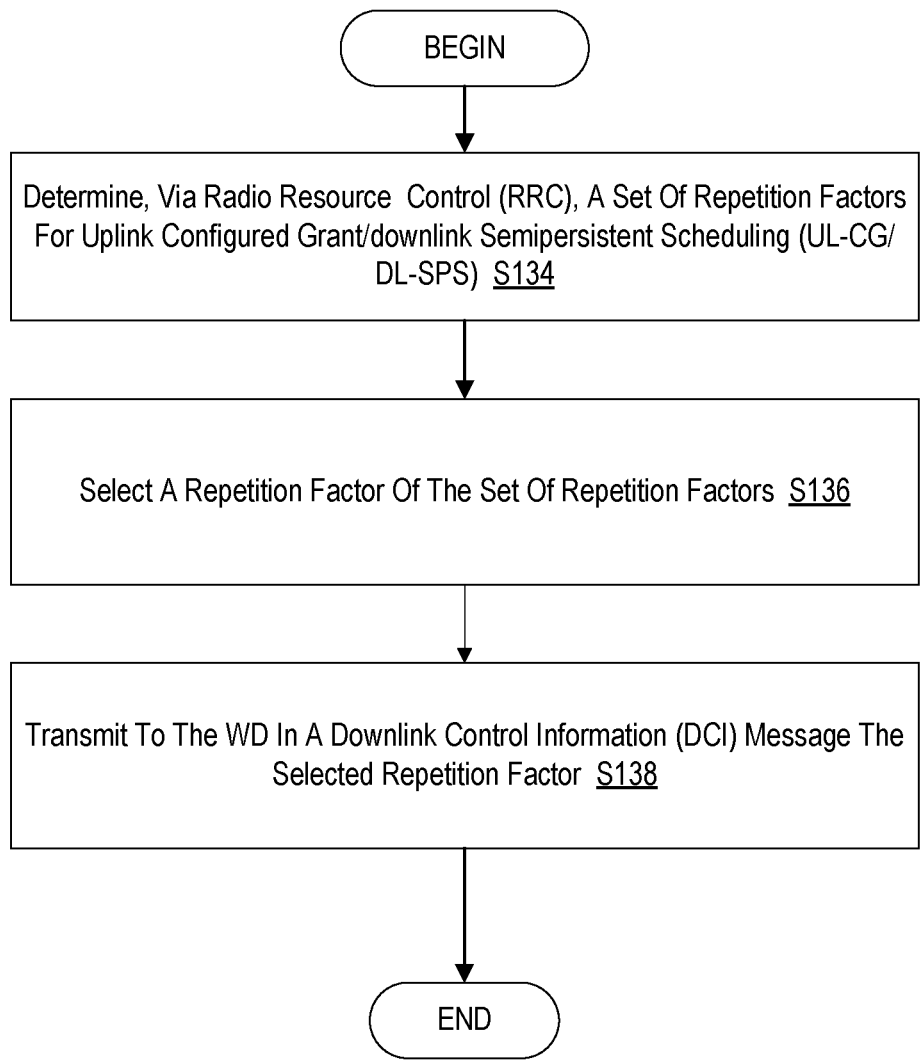
FIG. 8 is a flowchart of an exemplary process in a network node for repetition in uplink (UL) configured grant (CG)/downlink (DL) semipersistent scheduling (SPS) transmission.

FIG. 8 is a flowchart of an exemplary process in a network node 16 for repetition in uplink (UL) configured grant (CG)/downlink (DL) semipersistent scheduling (SPS) transmission. One or more blocks described herein may be performed by one or more elements of network node 16 such as by one or more of processing circuitry 68 (including the repetition factor determiner 32), processor 70, radio interface 62 and/or communication interface 60. Network node 16 such as via processing circuitry 68 and/or processor 70 and/or radio interface 62 and/or communication interface 60 is configured to determine via RRC a set of repetition factors for UL-CG/D1-SPS (Block S134). The process includes selecting a repetition factor of the set of repetition factors (Block S136). The process also includes transmitting to the WD 22 in DCI, the selected repetition factor (Block S138).

In some embodiments, a process in a network node includes determining a set of repetition factors for an uplink configured grant, UL-CG, or for a dynamic grant, each repetition factor indicating a number of repetitions of performing uplink transmissions. The process also includes signaling by radio resource control, RRC, signaling, an indication of the determined set of repetition factors to the WD 22. The process also includes determining a particular one of the repetition factors in the determined set of repetition factors to be used by the WD 22 to determine when to perform the uplink transmissions. The process also includes signaling in downlink control information, DCI, an indication of the particular one of the repetition factors to be used by the WD 22 to determine when to perform the uplink transmissions.

Figure 9:
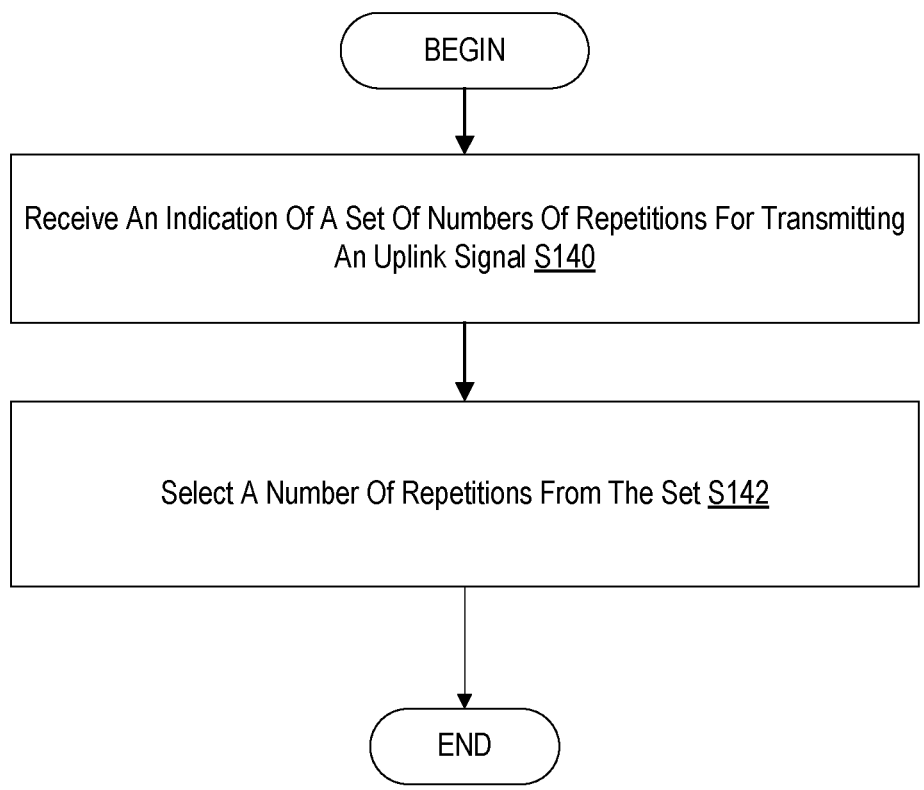
FIG. 9 is a flowchart of an exemplary process in a wireless device for repetition in uplink (UL) configured grant (CG)/downlink (DL) semipersistent scheduling (SPS) transmission.

FIG. 9 is a flowchart of an exemplary process in a wireless device 22 for repetition in uplink (UL) configured grant (CG)/downlink (DL) semipersistent scheduling (SPS) transmission. One or more blocks described herein may be performed by one or more elements of wireless device 22 such as by one or more of processing circuitry 84 (including the repetition factor selector 34), processor 86, radio interface 82 and/or communication interface 60. Wireless device 22 such as via processing circuitry 84 and/or processor 86 and/or radio interface 82 is configured to receive an indication of a set of numbers of repetitions for transmitting an uplink signal (Block S140). The process also includes selecting a number of repetitions from the set (Block S142).

In some embodiments, a process in a wireless device includes receiving, via radio resource control, RRC, signaling, a time domain resource assignment, TDRA, table configured to indicate a set of repetition factors from which a repetition factor is to be used by the WD 22 for slot based repetition or back to back repetition of uplink transmission. The process also includes one of: receiving, via downlink control information, DCI, signaling, an indication of a particular repetition factor of the set of repetition factors, the indicated particular repetition factor for use by the WD 22 for uplink transmissions. The process also includes selecting a default repetition factor, the default repetition factor for use by the WD 22 for uplink transmissions.

Figure 10:
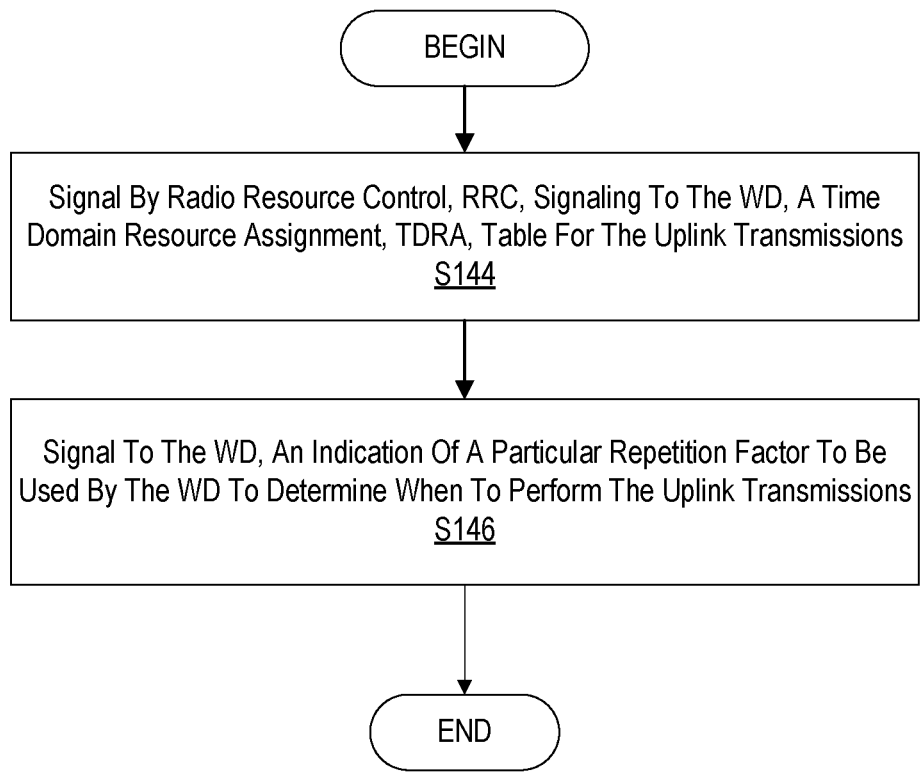
FIG. 10 is a flowchart of an exemplary process in a network node for repetition in uplink (UL) configured grant (CG)/downlink (DL) semipersistent scheduling (SPS) transmission.

FIG. 10 is a flowchart of an example process in a network node for repetition in uplink (UL) configured grant (CG)/downlink (DL) semipersistent scheduling (SPS) transmission. One or more blocks described herein may be performed by one or more elements of network node 16 such as by one or more of processing circuitry 68 (including the repetition factor determiner 32), processor 70, radio interface 62 and/or communication interface 60. Network node 16 such as via processing circuitry 68 and/or processor 70 and/or radio interface 62 and/or communication interface 60 is configured to signal by radio resource control, RRC, signaling to the WD 22, a time domain resource assignment, TDRA, table for the uplink transmissions (Block S144). The process also includes signaling to the WD 22, an indication of a particular repetition factor to be used by the WD 22 to determine when to perform the uplink transmissions (Block S146).

Figure 11:
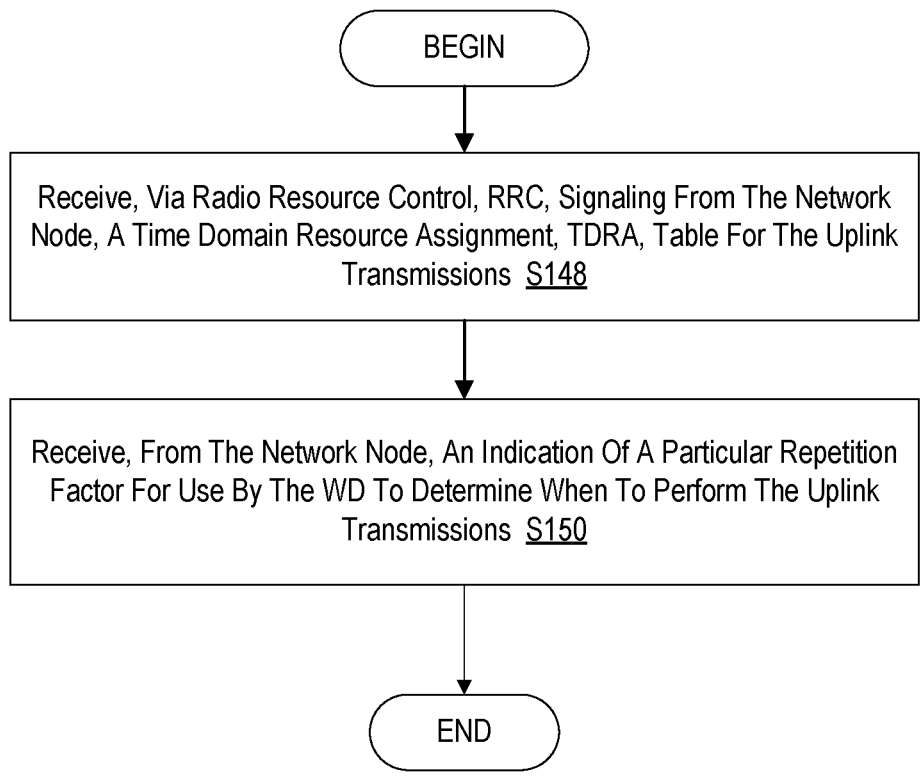
FIG. 11 is a flowchart of an exemplary process in a wireless device for repetition in uplink (UL) configured grant (CG)/downlink (DL) semipersistent scheduling (SPS) transmission.

FIG. 11 is a flowchart of an example process in a wireless device 22 for repetition in uplink (UL) configured grant (CG)/downlink (DL) semipersistent scheduling (SPS) transmission. One or more blocks described herein may be performed by one or more elements of wireless device 22 such as by one or more of processing circuitry 84 (including the repetition factor selector 34), processor 86, radio interface 82 and/or communication interface 60. Wireless device 22 such as via processing circuitry 84 and/or processor 86 and/or radio interface 82 is configured to receive, via radio resource control, RRC, signaling from the network node 16, a time domain resource assignment, TDRA, table for the uplink transmissions (Block S148). The process also includes receiving, from the network node 16, an indication of a particular repetition factor for use by the WD 22 to determine when to perform the uplink transmissions (Block S150).

Having described the general process flow of arrangements of the disclosure and having provided examples of hardware and software arrangements for implementing the processes and functions of the disclosure, the sections below provide details and examples of arrangements for repetition in uplink (UL) configured grant (CG)/downlink (DL) semi-persistent scheduling (SPS) transmission.

RRC Change:

A set of possible repetition factors for a UL-CG/DL-SPS can be determined in an RRC table. In 3GPP Rel-15, RepK is a value of 1,2,4, or 8. However, here, repK can be chosen to be a set of values, i.e., repK={repKvalue1,repKvalue2, repKvalue3,repKvalue4}, e.g., repK⊆{1,2,4,8}, or repK={1, 2, 4, 16}.

The choice of values for the individual repK values can be made from a predefined set, e.g., repKvalue_i⊆{1, 2, 4, 8, 12, 16}, and one or more of the repK values may be fixed, making, e.g., the first two values always 1 and 2, and the remaining values configurable.

The RRC ConfiguredGrantConfig information element is changed as underlined in the following code.

| ConfiguredGrantConfig information element |
|---|
| -- ASN1START |
| -- TAG-CONFIGUREDGRANTCONFIG-START |
| ConfiguredGrantConfig ::=                    SEQUENCE { |
| frequencyHopping                             ENUMERATED {intraSlot, interSlot} |
| OPTIONAL, -- Need S, |
| cg-DMRS-Configuration                        DMRS-UplinkConfig, |
| mcs-Table                                    ENUMERATED {qam256, qam64LowSE} |
| OPTIONAL, -- Need S |
| mcs-TableTransformPrecoder                   ENUMERATED {qam256, qam64LowSE} |
| OPTIONAL, -- Need S |
| uci-OnPUSCH                                  SetupRelease { CG-UCI-OnPUSCH } |
| OPTIONAL, -- Need M |
| resourceAllocation                           ENUMERATED { resourceAllocationType0, |
| resourceAllocationType1, dynamicSwitch }, |
| rbg-Size                                     ENUMERATED {config2} |

-continued

| ConfiguredGrantConfig information element |
|---|

```
OPTIONAL, -- Need S
    powerControlLoopToUse           ENUMERATED {n0, n1},
    p0-PUSCH-Alpha                  P0-PUSCH-AlphaSetId,
    transformPrecoder               ENUMERATED {enabled, disabled}
OPTIONAL, -- Need S
    nrofHARQ-Processes              INTEGER(1..16),
    repK                            SEQUENCE { n1, n2, n4, n8 },
    repK-RV                         ENUMERATED {s1-0231, s2-0303, s3-0000}
OPTIONAL, -- Need R
    periodicity                     ENUMERATED {
                                        sym2, sym7, sym1x14, sym2x14, sym4x14, sym5x14,
sym8x14, sym10x14, sym16x14, sym20x14,
                                        sym32x14, sym40x14, sym64x14, sym80x14,
sym128x14, sym160x14, sym256x14, sym320x14, sym512x14,
                                        sym640x14, sym1024x14, sym1280x14, sym2560x14,
sym5120x14,
                                        sym6, sym1x12, sym2x12, sym4x12, sym5x12,
sym8x12, sym10x12, sym16x12, sym20x12, sym32x12,
                                        sym40x12, sym64x12, sym80x12, sym128x12,
sym160x12, sym256x12, sym320x12, sym512x12, sym640x12,
                                        sym1280x12, sym2560x12
    },
    configuredGrantTimer            INTEGER (1..64)
OPTIONAL, -- Need R
    rrc-ConfiguredUplinkGrant       SEQUENCE {
        timeDomainOffset            INTEGER (0..5119),
        timeDomainAllocation        INTEGER (0..15),
        frequencyDomainAllocation   BIT STRING (SIZE(18)),
        antennaPort                 INTEGER (0..31),
        dmrs-SeqInitialization      INTEGER (0..1)
OPTIONAL, -- Need R
        precodingAndNumberOfLayers  INTEGER (0..63),
        srs-ResourceIndicator       INTEGER (0..15)
OPTIONAL, -- Need R
        mcsAndTBS                   INTEGER (0..31),
        frequencyHoppingOffset      INTEGER (1..
maxNrofPhysicalResourceBlocks-1)    OPTIONAL, -- Need R
        pathlossReferenceIndex      INTEGER (0..maxNrofPUSCH-
PathlossReferenceRSs-1),
        index-repK                  INTEGER (0..3),
        ...
    }                               OPTIONAL, --
Need R
    ...
}
CG-UCI-OnPUSCH ::= CHOICE {
    dynamic                         SEQUENCE (SIZE (1..4)) OF BetaOffsets,
    semiStatic                      BetaOffsets
}
```

Note that since Type 1 UL-CG/DL-SPS does not receive DCI for activation or other dynamic indication of repetition, Type 1 UL-CG/DL-SPS takes a value for data repetition from the given set repK in RRC using, for example, one of the following ways:

- by a pre-determined rule, for example the smallest value in the set repK; or
- using a parameter under "rrc-ConfiguredUplinkGrant", for example, the "index-repK" illustrated above.

Note that this embodiment holds even if the number of possible repetitions is more than four values of {1, 2, 4, 8}. Again, the RRC parameter repK is assigned the set of possible repetition factors, and one value is selected from the set as the actual number of repetitions for UL CG PUSCH.

Dynamic Indication of Repetition Factor Using DCI Messages:

In one embodiment, the repetition field is introduced in DCI. In 3GPP Rel-15, the repetition factor can have values 1, 2, 4, and 8. Thus, 2 bits of information is sufficient to signal the repetition factor. For example, the following tables can be used to indicate the repetition factor or more generally, using the RRC-configured values in the repK-set.

TABLE 6

| Repetition field in DCI | Repetition factor |
|---|---|
| 00 | 1 |
| 01 | 2 |
| 10 | 4 |
| 11 | 8 |

TABLE 7

| Repetition field in DCI | Repetition factor |
|---|---|
| 00 | repKvalue_1 |
| 01 | repKvalue_2 |
| 10 | repKvalue_3 |
| 11 | repKvalue_4 |

In a future 3GPP release, more bits may be needed and used if more repetition factors are introduced.

In some examples, one value for the repetition field in DCI could mean the rep-K value is configured in ConfiguredGrantConfig, for example, if a 1-bit indication is used for dynamic indication of repetition factor. In such examples a value '0' (or '1') in DCI could mean rep-K=nX configured in ConfiguredGranConfig and a value '1' (or '0') could mean n(X-1). I.e., if rep-K=n8 a value '0' in DCI could mean n8 while a value '1' could mean n4. In other examples, value '1' could mean next higher than rep-K repetition factor.

In some examples, allowing finer repetition factor granularity (than 1, 2, 4 and 8), the repetition field in DCI indicates a repetition offset from configured rep-K according to Table 8 below:

TABLE 8

| Repetition field in DCI | Repetition factor |
| --- | --- |
| 00 | rep-K − a |
| 01 | rep-K |
| 10 | rep-K + a |
| 11 | rep-K + 2a | where "a" in Table 8 is configured by RRC.

Dynamic Indication of Repetition Factor Using TDRA Table:

In one embodiment, there is a bit in DCI for indicating back-to-back repetition or slot-based repetition.

In another embodiment, the time domain resource allocation field in DCI is used to dynamically indicate the repetition factor. A column is added to the TDRA table to indicate this repetition is for slot-based repetition or back-to-back repetition. This is shown in the following table 9.

TABLE 9

| Entry | Mapping type | S | L | Back-to-back (0) Or Slot-based (1) repetition | Nominal number of repetitions K |
| --- | --- | --- | --- | --- | --- |
| 0 | | 0 | 7 | 0 | 1 |
| 1 | | 7 | 7 | 0 | 1 |
| 2 | | 0 | 14 | 0 | 1 |
| 3 | | 0 | 4 | 0 | 1 |
| 4 | | 0 | 14 | 0 | 4 |
| 5 | | 7 | 7 | 0 | 2 |
| 6 | | 0 | 14 | 0 | 2 |
| 7 | | 0 | 14 | 0 | 8 |
| 8 | | 0 | 7 | 1 | 1 |
| 9 | | 7 | 7 | 1 | 2 |
| 10 | | 0 | 14 | 1 | 2 |
| 11 | | 0 | 4 | 1 | 4 |
| 12 | | 0 | 2 | 1 | 4 |
| 13 | | 7 | 7 | 1 | 8 |
| 14 | | 0 | 4 | 1 | 4 |
| 15 | | 0 | 2 | 1 | 8 |

Note that when S=0, L=14, then slot-based repetition and back-to back repetition are the same. Thus, one of the redundant rows can be removed from the table. For example, in Table 7 either Row 6 or Row 10 can be removed. That reduces the number of required bits for signaling, or may give the opportunity to introduce a new row with another combination of values.

In one embodiment, the entries in the "Nominal number of repetitions K" column are configurable in the same manner as described above with configurable repKvalue_i values using DCI. Then, as an example, the entries with 8 repetitions in the table would use the configured repK-value_4 value.

Repetition with Considering PUSCH Type A and Type B Transmission:

The PUSCH transmission can be Type A or Type B. For PUSCH mapping Type A, the starting symbol is always #0 in a slot (i.e., first symbol of a slot), and the duration of PUSCH can be 4 to 14 symbols. For PUSCH mapping Type B, the starting symbol can be any position within a slot and the PUSCH duration can be 2 to 14 symbols.

There are at Least Two Manners of PUSCH Repetition:
"Slot-based repetition", also known as "slot-aggregation". As defined in 3GPP Rel-15, PUSCH repetition can be in the slot-aggregation manner, where each PUSCH repetition occupies the same set of symbols in each slot.

"Back-to-back repetition". As defined in 3GPP Rel-16, PUSCH repetitions are consecutive (unless certain OFDM symbols have to be skipped, e.g., due to TDD UL/DL pattern) and typically do not occupy the same set of symbols in a slot. "Back-to-back repetition" include both "mini-slot based repetition" and "multi-segment transmission", depending on the duration of a nominal repetition.

An indicator may be defined to differentiate the two manners of PUSCH repetition for both dynamically scheduled PUSCH and UL CG scheduled PUSCH. Many variations of the indicator value can be used. In the following, the discussion uses this example: '0' indicating back-to-back repetition, '1' indicating slot-based repetition (also known as slot aggregation).

In Alternative 1, the two manners of PUSCH repetition are differentiated dynamically via DCI.

In Alternative 1-a, the two manners of PUSCH repetition are differentiated dynamically via a field in the TDRA table. For Type A, if there is not the possibility for back-to-back repetition then the field may be set to 1 for indicating back-to-back/slot-based transmission. For Type B, the indication can be 0 or 1, with '0' indicating back-to-back repetition, '1' indicating slot-based repetition (also known as slot aggregation). This is shown in Table 8, where '0/1' is used to show that one value of either '0' or '1' should be used in the table.

In Alternative 1-b, a dedicated DCI field is used to indicate the manner of PUSCH repetition.

In Alternative 2, the two manners of PUSCH repetition are differentiated semi-statically via an RRC parameter.

In Alternative 2-a, a dedicated RRC parameter is used to indicate the manner of PUSCH repetition. This RRC parameter can be included in PUSH-Config IE and/or configuredGrantConfiguration IE.

In Alternative 2-b, the manner of PUSCH repetition is implicitly derived from one or more RRC parameters. For example, value of the number of repetitions can be used to implicitly indicate the manner of PUSCH repetition. For example, if the number of repetitions is one of {1, 2, 4, 8}, "Slot-based repetition" is applied; otherwise, "Back-to-back repetition" is applied.

TABLE 10

| Row index | PUSCH mapping type | K2 | Back-to-back Or Slot-based repetition | S | L |
| --- | --- | --- | --- | --- | --- |
| 1 | Type A | j | 1 | 0 | 14 |
| 2 | Type A | j | 1 | 0 | 12 |
| 3 | Type A | j | 1 | 0 | 10 |
| 4 | Type B | j | 0/1 | 2 | 10 |
| 5 | Type B | j | 0/1 | 4 | 10 |

TABLE 10-continued

| Row index | PUSCH mapping type | K2 | Back-to-back Or Slot-based repetition | S | L |
|---|---|---|---|---|---|
| 6 | Type B | j | 0/1 | 4 | 8 |
| 7 | Type B | j | 0/1 | 4 | 6 |
| 8 | Type A | j + 1 | 1 | 0 | 14 |
| 9 | Type A | j + 1 | 1 | 0 | 12 |
| 10 | Type A | j + 1 | 1 | 0 | 10 |
| 11 | Type A | j + 2 | 1 | 0 | 14 |
| 12 | Type A | j + 2 | 1 | 0 | 12 |
| 13 | Type A | j + 2 | 1 | 0 | 10 |
| 14 | Type B | j | 0/1 | 8 | 6 |
| 15 | Type A | j + 3 | 1 | 0 | 14 |
| 16 | Type A | j + 3 | 1 | 0 | 10 |

In one embodiment, the DCI containing the K repetitions value can override RRC configured K repetitions. The DCI can be sent for retransmission allocation or new allocation for an already granted transmission resource.

In one embodiment, if the DCI does not have the field of dynamic repetition (e.g., not configured or legacy, i.e., existing, DCI with no field for Krep), the WD 22 can follow a variety of approaches:
- Alternative 1: WD 22 selects a default value of repetition;
  a) E.g., just one transmission (one repetition);
- Alternative 2: WD 22 select a value from the set of values in RRC configured by a pre-determined rule;
  a) E.g., the smallest value in the set;
- Alternative 3: WD 22 follows the initial grant (same amount of repetitions in initial dynamic grant or CG/SPS);

In one embodiment, different repetitions can have different modulation and coding scheme (MCS) values. The repetitions can be RRC or DCI configured. This may require a laborious task for DCI construction due to multiple MCS indications.

In one embodiment, the time-gap (slot/mini-slot/symbol) between repetitions can be configured by RRC or DCI.

In one embodiment, some code spaces of the MCS field can be used to indicate repetitions. For Ultra Reliable Low Latency Communications (URLLC), if a 4-bit MCS field is used, then higher values of MCS (low reliability) may not be required.

In one embodiment, a 1-bit field can be included in DCI to indicate back-to-back or slot-based repetition.

In some embodiments, DCI and RRC configurations may together indicate a repetition. Below is an algorithm that summarizes the action. The network node 16 equips the WD 22 with an RRC configuration that contains various options for repetition value that can be included/cited in a DCI. In some embodiments, the network provides repKset= {p, . . . , r} in RRC configuration where size=length(repKset) is $N$, i.e., repKset contains $N$ elements where each element represents a repetition value and the repetition value is a part of natural number set.

As an example, the repKset can be equivalent to repK in ConfiguredGrantConfig IE.

Next, a DCI (meant for activation, retransmission, or change in resource allocation for an already granted resource) can indicate which element from an RRC configured repKset is selected. An example is presented in Table 7.

An additional measure can be indicated in the DCI (or in RRC) which conveys that the repetitions are back-to-back or slot-based (slot-aggregation).

If the repetition is cited in a dedicated field in the DCI, then the field size in bits should be equal or greater than ceil(log 2($N$)). If repKset is not configured in the RRC, then the indicated value in the DCI field for repetition can be based on a pre-defined rule.

The code-space value may be the repetition value, e.g., a 4-bit field can indicate repetition value 1, 2, 3 and 4 if RRC repKset is not configured.

The WD 22 may always assume X repetitions if RRC repKset is not configured.

In one embodiment for CG type 2, the option 4 repetition according to 3GPP Rel. 16 is used if the CG is activated by a PDCCH with a DCI format that signals a nominal number of repetitions. The nominal number of repetitions can be signaled either explicitly in its own field, or jointly coded with other parameters, e.g., in the TDRA table, or implicitly determined. In this case, the repK in the RRC is ignored. In an alternative embodiment, dynamic indication can be activated or de-activated using RRC or medium access control repeat element (MAC CE) signaling. If dynamic indication is de-activated, an indicated nominal number of repetitions in the DCI is ignored and the RRC configured repK is used. If dynamic indication is activated, the nominal number of repetitions indicated by DCI is used.

In one embodiment for CG type 2, option 4 repetition according to rel. 16 is used if the CG is activated by a PDCCH with a DCI format that signals a nominal number of repetitions. The nominal number of repetitions can be signaled either explicitly in its own field, or jointly coded with other parameters, e.g., in the TDRA table, or implicitly determined. In this case, the repK in RRC is ignored. If the CG grant is activated by a physical downlink control channel (PDCCH) with a DCI format that does not signal a nominal number of repetitions, then Rel. 15 slot-based repetition is used, with the repK from RRC determining the number of repetitions.

Some embodiments can be applied to the repetitions that belong to dynamic PUSCH or CG PUSCH or dynamic physical downlink shared channel (PDSCH) or semi-persistent scheduling (SPS).

According to one aspect, a network node 16 configured to communicate with a wireless device (WD 22). The network node 16 is configured to, and/or comprising a radio interface 62 and/or comprising processing circuitry 68 configured to determining, via radio resource control (RRC), a set of repetition factors for uplink configured grant/downlink semipersistent scheduling (UL-CG/DL-SPS), selecting a repetition factor of the set of repetition factors, and transmitting to the WD 22 in a downlink control information (DCI) message the selected repetition factor.

According to this aspect, in some embodiments, the selecting is based on a type of repetition. In some embodiments, the type of repetition is one of back-to-back repetition and slot-based repetition.

According to another aspect, method implemented in a network node 16, includes determining, via radio resource control (RRC), a set of repetition factors for uplink configured grant/downlink semipersistent scheduling (UL-CG/DL-SPS), selecting a repetition factor of the set of repetition factors, and transmit to the WD 22 in a downlink control information (DCI) message the selected repetition factor.

According to this aspect, in some embodiments, the selecting is based on a type of repetition. In some embodiments, the type of repetition is one of back-to-back repetition and slot-based repetition.

According to yet another aspect, a wireless device (WD) configured to communicate with a network node, the WD having a radio interface and/or comprising processing circuitry configured to receive an indication of a set of numbers of repetitions for transmitting an uplink signal and select a number of repetitions from the set.

According to another aspect, a method in a wireless device (WD) includes receiving an indication of a set of numbers of repetitions for transmitting an uplink signal and selecting a number of repetitions from the set.

According to one aspect, a network node 16 configured to configure a wireless device, WD 22, to perform uplink transmissions. The network node 16 includes processing circuitry 68 that may be configured to determine a set of repetition factors for an uplink configured grant, UL-CG, or for a dynamic grant, each repetition factor indicating a number of repetitions of performing uplink transmissions. The processing circuitry 68 may be further configured to signal by radio resource control, RRC, signaling, an indication of the determined set of repetition factors to the WD 22. The processing circuitry 68 may also be further configured to determine a particular one of the repetition factors in the determined set of repetition factors to be used by the WD 22 to determine when to perform the uplink transmissions. The processing circuitry 68 is also configured to signal in downlink control information, DCI, an indication of the particular one of the repetition factors to be used by the WD 22 to determine when to perform the uplink transmissions.

According to this aspect, in some embodiments, determining the set of repetition factors includes forming a union of two subsets of repetition factors, one of the two subsets being fixed and the other of the two subsets being configurable. In some embodiments, the determined set of repetition factors includes at least one integer that is other than a power of two. In some embodiments, the particular one of the repetition factors to be used by the WD 22 is indicated by a single offset to be added to or subtracted from a preconfigured repetition factor. In some embodiments, a time domain resource assignment, TDRA, table is configured to indicate whether the particular one of the repetition factors to be used by the WD 22 is for slot based repetition or back to back repetition. In some embodiments, RRC signaling is used to transmit the TDRA table to the WD 22 and wherein DCI indicates an entry in the table indicating a nominal number of repetitions to be used by the WD 22 to determine when to perform the uplink transmissions. In some embodiments, a number of repetitions indicated by the particular one of the repetition factors to be used by the WD 22 overrides a repetition factor indicated by RRC signaling. In some embodiments, RRC signaling is used to indicate whether the uplink transmissions are to use slot based repetition or back to back repetition. In some embodiments, each repetition factor in the determined set of repetition factors is associated with a different modulation and coding scheme. In some embodiments, DCI signaling is used to indicate a time between repetitions of uplink transmissions. In some embodiments, the particular one of the repetition factors to be used by the WD 22 to determine when to perform the uplink transmissions is indicated in a modulation and coding scheme, MCS, field of the DCI. In some embodiments, a repetition factor is one of a number of repetitions corresponding to a single grant.

According to another aspect, a method in a network node 16 to configure a wireless device, WD 22, to perform uplink transmissions is provided. The method may include determining a set of repetition factors for an uplink configured grant, UL-CG, or for a dynamic grant, each repetition factor indicating a number of repetitions of performing uplink transmissions. The method also may include signaling by radio resource control, RRC, signaling, an indication of the determined set of repetition factors to the WD 22. The method may also include determining a particular one of the repetition factors in the determined set of repetition factors to be used by the WD 22 to determine when to perform the uplink transmissions. The method may further include signaling in downlink control information, DCI, an indication of the particular one of the repetition factors to be used by the WD 22 to determine when to perform the uplink transmissions.

According to this aspect, in some embodiments, determining the set of repetition factors includes forming a union of two subsets of repetition factors, one of the two subsets being fixed and the other of the two subsets being configurable. In some embodiments, the determined set of repetition factors includes at least one integer that is other than a power of two. In some embodiments, the particular one of the repetition factors to be used by the WD 22 is indicated by a single offset to be added to or subtracted from a preconfigured repetition factor. In some embodiments, a time domain resource assignment, TDRA, table is configured to indicate whether the particular one of the repetition factors to be used by the WD 22 is for slot based repetition or back to back repetition. In some embodiments, RRC signaling is used to transmit the TDRA table to the WD 22 and wherein DCI indicates an entry in the table indicating a nominal number of repetitions to be used by the WD 22 to determine when to perform the uplink transmissions. In some embodiments, a number of repetitions indicated by the particular one of the repetition factors to be used by the WD 22 overrides a repetition factor indicated by RRC signaling. In some embodiments, RRC signaling is used to indicate whether the uplink transmissions are to use slot based repetition or back to back repetition. In some embodiments, each repetition factor in the determined set of repetition factors is associated with a different modulation and coding scheme. In some embodiments, DCI signaling is used to indicate a time between repetitions of uplink transmissions. In some embodiments, the particular one of the repetition factors to be used by the WD 22 to determine when to perform the uplink transmissions is indicated in a modulation and coding scheme, MCS, field of the DCI. In some embodiments, a repetition factor is one of a number of repetitions corresponding to a single grant.

According to yet another aspect, a WD 22 is configured to perform uplink transmissions to a network node 16. The WD 22 includes processing circuitry 84 configured to receive, via radio resource control, RRC, signaling, a time domain resource assignment, TDRA, table configured to indicate a set of repetition factors from which a repetition factor is to be used by the WD 22 for slot based repetition or back to back repetition of uplink transmission. The processing circuitry 84 is further configured to one of: receive, via downlink control information, DCI, signaling, an indication of a particular repetition factor of the set of repetition factors, the indicated particular repetition factor for use by the WD 22 for uplink transmissions; and select a default repetition factor, the default repetition factor for use by the WD 22 for uplink transmissions.

According to this aspect, in some embodiments, the default repetition factor is a minimum repetition factor in a set of repetition factors signaled via RRC signaling. In some embodiments, the default repetition factor is selected when the WD 22 is not designed to extract an indication of a repetition factor in the DCI.

According to another aspect, a method in a wireless device, WD 22, configured to perform uplink transmissions to a network node 16 is provided. The method includes receiving, via radio resource control, RRC, signaling, a time domain resource assignment, TDRA, table configured to indicate a set of repetition factors from which a repetition factor is for use by the WD 22 for slot based repetition or back to back repetition of uplink transmission. The method also includes one of: receiving, via downlink control information, DCI, signaling, an indication of a particular repetition factor of the set of repetition factors, the indicated particular repetition factor for use by the WD 22 for uplink transmissions; and selecting a default repetition factor, the default repetition factor for use by the WD 22 for uplink transmissions.

According to this aspect, in some embodiments, the default repetition factor is a minimum repetition factor in a set of repetition factors signaled via RRC signaling. In some embodiments, the default repetition factor is selected when the WD 22 is not designed to extract an indication of a repetition factor in the DCI.

According to yet another aspect, a network node 16 is configured to configure a wireless device, WD 22, to perform uplink transmissions. The network node 16 is configured to signal by radio resource control, RRC, signaling to the WD 22, a time domain resource assignment, TDRA, table for the uplink transmissions and signal to the WD 22, an indication of a particular repetition factor to be used by the WD 22 to determine when to perform the uplink transmissions.

According to this aspect, in some embodiments, the TDRA table comprises a set of repetition factors for an uplink configured grant, UL-CG, or for a dynamic grant and wherein each repetition factor in the set of repetition factors indicates a number of repetitions of performing uplink transmissions. In some embodiments, the particular repetition factor is comprised in the set of repetition factors and wherein the indication of the particular repetition factor comprises an entry in the TDRA table indicating a number of repetitions to be used by the WD 22 to determine when to perform the uplink transmissions. In some embodiments, the number of repetitions indicated by the entry in the TDRA table overrides a repetition factor indicated by RRC signaling. In some embodiments, the indication of the particular repetition factor to be used by the WD 22 is signaled by the network node 16 using RRC signaling. In some embodiments, the indication of the particular repetition factor to be used by the WD 22 is signaled by the network node 16 using downlink control information, DCI, signaling. In some embodiments, the TDRA table is configured to indicate whether the particular repetition factor to be used by the WD 22 is for slot-based repetition or back-to-back repetition. In some embodiments, the network node 16 is further configured to use RRC signaling to indicate to the WD 22 whether the uplink transmissions are to use slot-based repetition or back-to-back repetition. In some embodiments, the indication of the particular repetition factor to be used by the WD 22 is signaled by the network node 16 using RRC signaling and wherein a number of repetitions for an uplink configured grant, UL-CG to be used by the WD 22 to determine when to perform the uplink transmissions is determined by the WD 22 based on the particular repetition factor when the TDRA table does not indicate a nominal number of repetitions and the UL-CG is activated by a physical downlink control channel, PDCCH, in a downlink control information, DCI, format associated with that TDRA table. In some embodiments, the indication of the particular repetition factor to be used by the WD 22 is signaled by the network node 16 using RRC signaling and wherein the particular repetition factor is ignored by the WD 22 when the TDRA table indicates a nominal number of repetitions and the UL-CG is activated by a physical downlink control channel, PDCCH, in a downlink control information, DCI, format associated with that TDRA table. In some embodiments, a number of repetitions for the uplink configured grant, UL-CG to be used by the WD 22 to determine when to perform the uplink transmissions is determined by the WD 22 based on the nominal number of repetitions indicated in the TDRA table. In some embodiments, the uplink configured grant, UL-CG, is a UL-CG type 2.

According to another aspect, a method in a network node 16 configured to configure a wireless device, WD 22, to perform uplink transmissions is provided. The method includes signaling by radio resource control, RRC, signaling to the WD 22, a time domain resource assignment, TDRA, table for the uplink transmissions, and signaling to the WD 22, an indication of a particular repetition factor to be used by the WD 22 to determine when to perform the uplink transmissions.

According to this aspect, in some embodiments, the TDRA table comprises a set of repetition factors for an uplink configured grant, UL-CG, or for a dynamic grant and wherein each repetition factor in the set of repetition factors indicates a number of repetitions of performing uplink transmissions. In some embodiments, the particular repetition factor is comprised in the set of repetition factors and wherein the indication of the particular repetition factor comprises an entry in the TDRA table indicating a number of repetitions to be used by the WD 22 to determine when to perform the uplink transmissions. In some embodiments, the number of repetitions indicated by the entry in the TDRA table overrides a repetition factor indicated by RRC signaling. In some embodiments, the indication of the particular repetition factor to be used by the WD 22 is signaled by the network node 16 using RRC signaling. In some embodiments, the indication of the particular repetition factor to be used by the WD 22 is signaled by the network node 16 using downlink control information, DCI, signaling. In some embodiments, the indication of the particular repetition factor to be used by the WD 22 is signaled by the network node 16 using RRC signaling and wherein a number of repetitions for an uplink configured grant, UL-CG, or a dynamic grant, to be used by the WD 22 to determine when to perform the uplink transmissions is determined by the WD 22 based on the particular repetition factor when the TDRA table does not indicate a nominal number of repetitions and the UL-CG is activated by a physical downlink control channel, PDCCH, with a downlink control information, DCI, format associated with that TDRA table. In some embodiments, the indication of the particular repetition factor to be used by the WD 22 is signaled by the network node 16 using RRC signaling and wherein the particular repetition factor is ignored by the WD 22 when the TDRA table indicates a nominal number of repetitions and the UL-CG is activated by a physical downlink control channel, PDCCH, with a downlink control information, DCI, format associated with that TDRA table. In some embodiments, a number of repetitions for the uplink configured grant, UL-CG to be used by the WD 22 to determine when to perform the uplink transmissions is determined by the WD 22 based on the nominal number of repetitions indicated in the TDRA table. In some embodiments, the TDRA table is configured to indicate whether the particular repetition factor to be used by the WD 22 is for slot-based repetition or back-to-back repetition. In some embodiments, the method further includes using RRC signaling to indicate to the WD 22 whether the uplink transmissions are to use slot-based repetition or back-to-back repetition. In some embodiments, the uplink configured grant, UL-CG, is a UL-CG type 2.

According to another aspect, a WD is configured to perform uplink transmissions to a network node 16. The wireless device 22 is configured to receive, via radio resource control, RRC, signaling from the network node 16, a time domain resource assignment, TDRA, table for the uplink transmissions; and receive, from the network node 16, an indication of a particular repetition factor for use by the WD 22 to determine when to perform the uplink transmissions.

According to this aspect, in some embodiments, the TDRA table comprises a set of repetition factors for an uplink configured grant, UL-CG, or for a dynamic grant and wherein each repetition factor in the set of repetition factors indicates a number of repetitions of performing uplink transmissions. In some embodiments, the particular repetition factor is comprised in the set of repetition factors and wherein the indication of the particular repetition factor comprises an entry in the TDRA table indicating a number of repetitions to be used by the WD 22 to determine when to perform the uplink transmissions. In some embodiments, the number of repetitions indicated by the entry in the TDRA table overrides a repetition factor indicated by RRC signaling. In some embodiments, the indication of the particular repetition factor to be used by the WD 22 is received by the WD 22 in RRC signaling from the network node 16. In some embodiments, the indication of the particular repetition factor to be used by the WD 22 is received by the WD 22 in downlink control information, DCI, signaling from the network node 16. In some embodiments, the indication of the particular repetition factor to be used by the WD 22 is received by the WD 22 in RRC signaling from the network node 16 and wherein a number of repetitions for an uplink configured grant, UL-CG, to be used by the WD 22 to determine when to perform the uplink transmissions, is determined by the WD 22 based on the particular repetition factor when the TDRA table does not indicate a nominal number of repetitions and the UL-CG is activated by a physical downlink control channel, PDCCH, with a downlink control information, DCI, format associated with that TDRA table. In some embodiments, the indication of the particular repetition factor to be used by the WD 22 is received by the WD 22 in RRC signaling from the network node 16 and wherein the particular repetition factor is ignored by the WD 22 when the TDRA table indicates a nominal number of repetitions and the UL-CG is activated by a physical downlink control channel, PDCCH, with a downlink control information, DCI, format associated with that TDRA table. In some embodiments, a number of repetitions for the uplink configured grant, UL-CG, to be used by the WD 22 to determine when to perform the uplink transmissions is determined by the WD 22 based on the nominal number of repetitions indicated in the TDRA table. In some embodiments, the TDRA table is configured to indicate whether the particular repetition factor to be used by the WD 22 is for slot-based repetition or back-to-back repetition. In some embodiments, the network node 16 is further configured to use RRC signaling to indicate to the WD 22 whether the uplink transmissions are to use slot-based repetition or back-to-back repetition. In some embodiments, the uplink configured grant, UL-CG, is a UL-CG type 2.

According to yet another aspect, a method in a wireless device, WD 22, configured to perform uplink transmissions to a network node 16 is provided. The wireless device 22 is configured to receive, via radio resource control, RRC, signaling from the network node 16, a time domain resource assignment, TDRA, table for the uplink transmissions; and receive, from the network node 16, an indication of a particular repetition factor for use by the WD 22 to determine when to perform the uplink transmissions.

According to this aspect, in some embodiments, the TDRA table comprises a set of repetition factors for an uplink configured grant, UL-CG, or for a dynamic grant and wherein each repetition factor in the set of repetition factors indicates a number of repetitions of performing uplink transmissions. In some embodiments, the particular repetition factor is comprised in the set of repetition factors and wherein the indication of the particular repetition factor comprises an entry in the TDRA table indicating a number of repetitions to be used by the WD 22 to determine when to perform the uplink transmissions. In some embodiments, the number of repetitions indicated by the entry in the TDRA table overrides a repetition factor indicated by RRC signaling. In some embodiments, the indication of the particular repetition factor to be used by the WD 22 is received by the WD 22 in RRC signaling from the network node 16. In some embodiments, the indication of the particular repetition factor to be used by the WD 22 is received by the WD 22 in downlink control information, DCI, signaling from the network node 16. In some embodiments, the indication of the particular repetition factor to be used by the WD 22 is received by the WD 22 in RRC signaling from the network node 16 and wherein a number of repetitions for an uplink configured grant, UL-CG, to be used by the WD 22 to determine when to perform the uplink transmissions, is determined by the WD 22 based on the particular repetition factor when the TDRA table does not indicate a nominal number of repetitions and the UL-CG is activated by a physical downlink control channel, PDCCH, with a downlink control information, DCI, format associated with that TDRA table. In some embodiments, the indication of the particular repetition factor to be used by the WD 22 is received by the WD 22 in RRC signaling from the network node 16 and wherein the particular repetition factor is ignored by the WD 22 when the TDRA table indicates a nominal number of repetitions and the UL-CG is activated by a physical downlink control channel, PDCCH, with a downlink control information, DCI, format associated with that TDRA table. In some embodiments, a number of repetitions for the uplink configured grant, UL-CG, to be used by the WD 22 to determine when to perform the uplink transmissions is determined by the WD 22 based on the nominal number of repetitions indicated in the TDRA table. In some embodiments, the TDRA table is configured to indicate whether the particular repetition factor to be used by the WD 22 is for slot-based repetition or back-to-back repetition. In some embodiments, the network node 16 is further configured to use RRC signaling to indicate to the WD 22 whether the uplink transmissions are to use slot-based repetition or back-to-back repetition. In some embodiments, the uplink configured grant, UL-CG, is a UL-CG type 2.

Some examples include the following:

Example A1. A network node configured to communicate with a wireless device (WD), the network node configured to, and/or comprising a radio interface and/or comprising processing circuitry configured to:

determining, via radio resource control (RRC), a set of repetition factors for uplink configured grant/downlink semipersistent scheduling (UL-CG/DL-SPS);

selecting a repetition factor of the set of repetition factors; and transmitting to the WD in a downlink control information (DCI) message the selected repetition factor.

Example A2. The network node of Example A1, wherein the selecting is based on a type of repetition.

Example A3. The network node of Example A1, wherein the type of repetition is one of back-to-back repetition and slot-based repetition.

Example B1. A method implemented in a network node, the method comprising:

determining, via radio resource control (RRC), a set of repetition factors for uplink configured grant/downlink semipersistent scheduling (UL-CG/DL-SPS);

selecting a repetition factor of the set of repetition factors; and transmitting to the WD in a downlink control information (DCI) message the selected repetition factor.

Example B2. The method of Example B1, wherein the selecting is based on a type of repetition.

Example B3. The method of Example B1, wherein the type of repetition is one of back-to-back repetition and slot-based repetition.

Example C1. A wireless device (WD) configured to communicate with a network node, the WD configured to, and/or comprising a radio interface and/or comprising processing circuitry configured to:

receive an indication of a set of numbers of repetitions for transmitting an uplink signal; and select a number of repetitions from the set.

Example D1. A method in a wireless device (WD), the method comprising:

receiving an indication of a set of numbers of repetitions for transmitting an uplink signal; and selecting a number of repetitions from the set.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
|---|---|
| 3GPP | 3rd Generation Partnership Project |
| 5G | 5th Generation |
| ACK | Acknowledgement |
| CE | Control Element |
| CG | Configured Grant |
| DCI | Downlink Control Information |
| DL | Downlink |
| DMRS | Demodulation Reference Signal |
| GF | Grant-Free |
| gNB | Next Generation NodeB |
| ID | Identity |
| LCH | Logical Channel |
| LTE | Long-Term Evolution |
| MCS | Modulation and Coding Scheme |
| NACK | No Acknowledgement |
| NR | New Radio |
| PRACH | Physical Random-Access Channel |
| PUSCH | Physical Uplink Shared Channel |
| SNR | Signal-to-Noise Ratio |
| SPS | Semi-Persistent Scheduling |
| SUL | Supplemental Uplink |
| TTI | Transmission Time Interval |
| TO | Transmission Opportunity |
| UE | User Equipment |
| UL | Uplink |
| URLLC | Ultra-Reliable and Low-Latency Communications |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to configure a wireless device (WD) to perform uplink transmissions, the network node configured to:
   signal by radio resource control (RRC) signaling to the WD, a time domain resource assignment (TDRA) table for the uplink transmissions;
   signal to the WD, an indication of a particular repetition factor to be used by the WD to determine when to perform the uplink transmissions;
   the TDRA table comprising a set of repetition factors for one of an uplink configured grant (UL-CG) and a dynamic grant, and each repetition factor in the set of repetition factors indicating a number of repetitions of performing uplink transmissions;
   the particular repetition factor being included in the set of repetition factors and the indication of the particular repetition factor including an entry in the TDRA table indicating a number of repetitions to be used by the WD to determine when to perform the uplink transmissions; and
   the number of repetitions indicated by the entry in the TDRA table overriding a repetition factor indicated by RRC signaling.

2. The network node of claim 1, wherein the indication of the particular repetition factor to be used by the WD is signaled by the network node using RRC signaling.

3. The network node of claim 1, wherein the indication of the particular repetition factor to be used by the WD is signaled by the network node using downlink control information (DCI) signaling.

4. The network node of claim 1, wherein the network node is further configured to use RRC signaling to indicate to the WD whether the uplink transmissions are to use slot-based repetition or back-to-back repetition.

5. The network node of claim 1, wherein the uplink configured grant (UL-CG) is a UL-CG type 2.

6. A method in a network node configured to configure a wireless device (WD) to perform uplink transmissions, the method comprising:
   signaling by radio resource control (RRC) signaling to the WD, a time domain resource assignment (TDRA) table for the uplink transmissions;
   signaling to the WD, an indication of a particular repetition factor to be used by the WD to determine when to perform the uplink transmissions;
   the TDRA table comprising a set of repetition factors for one of an uplink configured grant (UL-CG) and a dynamic grant, and each repetition factor in the set of repetition factors indicating a number of repetitions of performing uplink transmissions;
   the particular repetition factor being included in the set of repetition factors and the indication of the particular repetition factor including an entry in the TDRA table indicating a number of repetitions to be used by the WD to determine when to perform the uplink transmissions; and
   the number of repetitions indicated by the entry in the TDRA table overriding a repetition factor indicated by RRC signaling.

7. The method of claim 6, wherein the indication of the particular repetition factor to be used by the WD is signaled by the network node using RRC signaling.

8. The method of claim 6, wherein the indication of the particular repetition factor to be used by the WD is signaled by the network node using downlink control information (DCI) signaling.

9. The method of claim 6, wherein the network node is further configured to use RRC signaling to indicate to the WD whether the uplink transmissions are to use slot-based repetition or back-to-back repetition.

10. The method of claim 6, wherein the uplink configured grant (UL-CG) is a UL-CG type 2.

11. A wireless device (WD) configured to perform uplink transmissions to a network node, the wireless device configured to:
   receive, via radio resource control (RRC) signaling from the network node, a time domain resource assignment (TDRA) table for the uplink transmissions;
   receive, from the network node, an indication of a particular repetition factor for use by the WD to determine when to perform the uplink transmissions;
   the TDRA table comprising a set of repetition factors for one of an uplink configured grant (UL-CG) and a dynamic grant, and each repetition factor in the set of repetition factors indicating a number of repetitions of performing uplink transmissions;
   the particular repetition factor being included in the set of repetition factors and the indication of the particular repetition factor including an entry in the TDRA table indicating a number of repetitions to be used by the WD to determine when to perform the uplink transmissions; and
   the number of repetitions indicated by the entry in the TDRA table overriding a repetition factor indicated by RRC signaling.

12. The WD of claim 11, wherein the indication of the particular repetition factor to be used by the WD is received by the WD in RRC signaling from the network node.

13. The WD of claim 11, wherein the indication of the particular repetition factor to be used by the WD is received by the WD in downlink control information (DCI) signaling from the network node.

14. The WD of claim 11, wherein the WD is further configured to receive RRC signaling indicating to the WD whether the uplink transmissions are to use slot-based repetition or back-to-back repetition.

15. The WD of claim 11, wherein the uplink configured grant (UL-CG) is a UL-CG type 2.

16. A method in a wireless device (WD) configured to perform uplink transmissions to a network node, the method comprising:
   receiving, via radio resource control (RRC) signaling from the network node, a time domain resource assignment (TDRA) table for the uplink transmissions;
   receiving, from the network node, an indication of a particular repetition factor for use by the WD to determine when to perform the uplink transmissions;
   the TDRA table comprising a set of repetition factors for one of an uplink configured grant (UL-CG) and a dynamic grant and each repetition factor in the set of repetition factors indicating a number of repetitions of performing uplink transmissions;
   the particular repetition factor being included in the set of repetition factors and the indication of the particular repetition factor including an entry in the TDRA table indicating a number of repetitions to be used by the WD to determine when to perform the uplink transmissions; and
   the number of repetitions indicated by the entry in the TDRA table overriding a repetition factor indicated by RRC signaling.

17. The method of claim 16, wherein the indication of the particular repetition factor to be used by the WD is received by the WD in RRC signaling from the network node.

18. The method of claim 16, wherein the indication of the particular repetition factor to be used by the WD is received by the WD in downlink control information (DCI) signaling from the network node.

19. The method of claim 16, further comprising receiving RRC signaling indicating to the WD whether the uplink transmissions are to use slot-based repetition or back-to-back repetition.

20. The method of claim 16, wherein the uplink configured grant (UL-CG) is a UL-CG type 2.

21. A wireless device (WD) configured to perform uplink transmissions to a network node, the wireless device configured to:
   receive, via radio resource control (RRC) signaling from the network node, a time domain resource assignment (TDRA) table for the uplink transmissions;
   receive, from the network node, an indication of a particular repetition factor for use by the WD to determine when to perform the uplink transmissions;
   the indication of the particular repetition factor to be used by the WD being received by the WD in RRC signaling from the network node and the particular repetition factor being ignored by the WD when the TDRA table indicates a nominal number of repetitions for an uplink configured grant (UL-CG) and the UL-CG is activated by a physical downlink control channel (PDCCH) with a downlink control information (DCI) format associated with that TDRA table; and
   a number of repetitions for the UL-CG to be used by the WD to determine when to perform the uplink transmissions being determined by the WD based on the nominal number of repetitions indicated in the TDRA table.

22. The WD of claim 21, wherein a number of repetitions for the uplink configured grant (UL-CG) to be used by the WD to determine when to perform the uplink transmissions, is determined by the WD based on the particular repetition factor when the TDRA table does not indicate a nominal number of repetitions and the UL-CG is activated by a physical downlink control channel (PDCCH) with a downlink control information (DCI) format associated with that TDRA table.

23. The WD of claim 21, wherein the WD is further configured to receive RRC signaling indicating to the WD whether the uplink transmissions are to use slot-based repetition or back-to-back repetition.

24. A method in a wireless device (WD) configured to perform uplink transmissions to a network node, the method comprising:
   receiving, via radio resource control (RRC) signaling from the network node, a time domain resource assignment (TDRA) table for the uplink transmissions;
   receiving, from the network node, an indication of a particular repetition factor for use by the WD to determine when to perform the uplink transmissions;
   the indication of the particular repetition factor to be used by the WD being received by the WD in RRC signaling from the network node and the particular repetition factor being ignored by the WD when the TDRA table indicates a nominal number of repetitions for an uplink configured grant (UL-CG) and the UL-CG is activated by a physical downlink control channel (PDCCH) with a downlink control information (DCI) format associated with that TDRA table; and
   a number of repetitions for UL-CG to be used by the WD to determine when to perform the uplink transmissions being determined by the WD based on the nominal number of repetitions indicated in the TDRA table.

25. The method of claim 24, wherein a number of repetitions for the uplink configured grant (UL-CG) to be used by the WD to determine when to perform the uplink transmissions, is determined by the WD based on the particular repetition factor when the TDRA table does not indicate a nominal number of repetitions and the UL-CG is activated by a physical downlink control channel (PDCCH) with a downlink control information (DCI) format associated with that TDRA table.

26. The method of claim 24, further comprising receiving RRC signaling indicating to the WD whether the uplink transmissions are to use slot-based repetition or back-to-back repetition.

* * * * *